(12) United States Patent
Forte et al.

(10) Patent No.: US 11,989,273 B2
(45) Date of Patent: May 21, 2024

(54) BIOMETRIC LOCKING METHODS AND SYSTEMS FOR INTERNET OF THINGS AND THE CONNECTED PERSON

(71) Applicant: University of Florida Research Foundation, Incorporated, Gainesville, FL (US)

(72) Inventors: Domenic J. Forte, Gainesville, FL (US); Damon Woodard, Newberry, FL (US); Fatemeh Ganji, Gainesville, FL (US); Sumaiya Shomaji, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 331 days.

(21) Appl. No.: 17/544,453

(22) Filed: Dec. 7, 2021

(65) Prior Publication Data
US 2022/0188393 A1    Jun. 16, 2022

Related U.S. Application Data

(60) Provisional application No. 63/199,249, filed on Dec. 16, 2020.

(51) Int. Cl.
*G06F 21/32*    (2013.01)
*G06F 21/60*    (2013.01)
(Continued)

(52) U.S. Cl.
CPC ............ *G06F 21/32* (2013.01); *G06F 21/602* (2013.01); *H04L 9/0643* (2013.01); *H04L 9/3278* (2013.01)

(58) Field of Classification Search
CPC ..... G06F 21/32; G06F 21/602; H04L 9/0643; H04L 9/3278; H04L 9/3231; H04L 9/50
See application file for complete search history.

(56) References Cited

U.S. PATENT DOCUMENTS 9,672,342 B2 * 6/2017 Walsh .................... G06F 21/32
10,432,409 B2 * 10/2019 Wallrabenstein ..... H04L 9/3066
(Continued)

OTHER PUBLICATIONS

Li, Qiming, Yagiz Sutcu and Nasir D. Memon. "Secure Sketch for Biometric Templates." International Conference on the Theory and Application of Cryptology and Information Security (2006). (Year: 2006).*

(Continued)

*Primary Examiner* — Michael R Vaughan
(74) *Attorney, Agent, or Firm* — ALSTON & BIRD LLP

(57) ABSTRACT

In general, embodiments of the present disclosure provide methods, apparatus, systems, computer program products, computing devices, computing entities, and/or the like for setting up biometric access for a legitimate user to a design. In accordance with various embodiments, a biometric template is received originating from the user and is inputted to a first secure sketch generator configured to use first transformation parameters comprising a hash function to generate a protected biometric template by hashing the biometric template. The protected biometric template is inputted to a second secure sketch generator configured to use second transformation parameters comprising a physical unclonable function serving as a fingerprint of the design to generate an original obfuscation key from the protected biometric template. The original obfuscation key is then used to obfuscate the design to generate an original bitstream, wherein the first and second transformation parameters and the original bitstream are stored on the design.

18 Claims, 11 Drawing Sheets

(51) Int. Cl.
    *H04L 9/06*    (2006.01)
    *H04L 9/32*    (2006.01)

(56) References Cited

U.S. PATENT DOCUMENTS 11,223,478 B2*  1/2022  Eldefrawy ............ H04L 9/0861
11,722,306 B2*  8/2023  Bahloul ................ H04L 9/3231
                                                  713/186

OTHER PUBLICATIONS

Y. Sutcu, Q. Li and N. Memon, "Protecting Biometric Templates With Sketch: Theory and Practice," in IEEE Transactions on Information Forensics and Security, vol. 2, No. 3, pp. 503-512, Sep. 2007 (Year: 2007).*

* cited by examiner

BIOMETRIC LOCKING METHODS AND SYSTEMS FOR INTERNET OF THINGS AND THE CONNECTED PERSON

CROSS-REFERENCE TO RELATED APPLICATIONS

This application claims priority to U.S. Provisional Patent Application Ser. No. 63/199,249 filed on Dec. 16, 2020, which is incorporated herein by reference in its entirety, including any figures, tables, drawings, and appendices.

GOVERNMENT SUPPORT

This invention was made with government support under W911NF-19-1-0102 awarded by the US Army Research Office. The government has certain rights in the invention.

TECHNICAL FIELD

The present application relates generally to biometric access control, and, more specifically to biometric access control combined with hardware obfuscation and physical unclonable functions.

BACKGROUND

Advances in semiconductors, computing, and networking have given rise to a "connected world" where machine-to-machine, human-to-machine, human-to-thing, etc. interactions are becoming commonplace. Nowhere is this more prominent than in the internet of things (IoT), where it is projected that billions of devices will be electronically connected in the near future. At the center of the IoT, however, are the human beings who shall serve dual roles. On the one hand, they will behave as users who take advantage of the services enabled by IoT devices—smart homes, cars, and cities, telehealth, supply chain management, retail, and more. On the other hand, they will also maintain and secure the IoT devices. For either role, there is a significant need for access control.

For instance, inexpensive hacks have been successfully demonstrated on more than 75% of Bluetooth low energy (BLE) smart locks in the market. As another example, IoT wearables and mobile devices have the potential to dramatically lower healthcare costs through remote health monitoring. However, due to the lack of physical presence at the time of data collection, these devices come with fraud risks since the identity of the user that transmits the health information is indeterminate. Another example is drones, which are envisioned to have IoT applications in delivery, agriculture, and much more. If drones could be taken over by unauthorized operators and turned into swarms of bots (much like botnets today), there could be dire social and economic consequences. For the latter, a prime example is access control in an autonomous vehicle, since it not only provides customized, comfortable vehicle operation for a user, but also prevents attackers from getting control of the vehicle.

With billions of IoT endpoints, traditional forms of access control, e.g., using passwords, are usually infeasible. A strong password defined for a device or service is difficult to remember, let alone for various devices. Moreover, although dongles, smart cards, etc. have become more popular, their theft and misuse are threats. On the contrary, significant advantages are provided by the biometric access control systems in terms of convenience and circumvention of attacks mentioned above. However, traditional biometric systems are further vulnerable to various physical attacks, which could result in template theft, illegal system access, etc.

Therefore, a need exists in the art for improved biometric access control systems that address known vulnerabilities to various physical attacks. It is with respect to these considerations and others that the disclosure herein is presented.

BRIEF SUMMARY

In general, embodiments of the present disclosure provide methods, apparatus, systems, computer program products, computing devices, computing entities, and/or the like for setting up biometric access for a legitimate user to a design (e.g., an integrated circuit design at a gate-level, a device implementing a design, a system implementing a design). In accordance with various embodiments, a biometric template is received originating from the legitimate user and is inputted to a first secure sketch generator configured to use first transformation parameters comprising a hash function to generate a protected biometric template by hashing the biometric template. The protected biometric template is inputted to a second secure sketch generator configured to use second transformation parameters comprising a physical unclonable function serving as a fingerprint of the design to generate an original obfuscation key from the protected biometric template. The original obfuscation key is then used to obfuscate the design to generate an original bitstream, wherein the first transformation parameters, the second transformation parameters, and the original bitstream are stored on the design.

In particular embodiments, a querying biometric template may be received originating from a querying user. In turn, a querying protected biometric template may be generated from the querying biometric template using the first transformation parameters stored on the design and a querying obfuscation key may be generated by applying the querying protected biometric template to the second transformation parameters stored on the design. Accordingly, the design may then be de-obfuscated by using the querying obfuscation key to generate a querying bitstream, wherein the design is activated in response to the querying bitstream equaling the original bitstream. In some embodiments, the first transformation parameters comprise helper data used in hashing the protected biometric template and the querying biometric template. In addition, in some embodiments, the second transformation parameters comprise helper data used in generating the original obfuscation key and the querying obfuscation key. Further, in some embodiments, the hash function comprises a non-invertible cryptographic hash function.

Furthermore, embodiments of the present disclosure provide methods, apparatus, systems, computer program products, computing devices, computing entities, and/or the like for setting up biometric access for a plurality of legitimate users to a design. In accordance with various embodiments, a plurality of biometric templates is received, wherein each biometric template has originated from one of the plurality of legitimate users. Each of the plurality of biometric templates is inputted to a first secure sketch generator to generate a plurality of protected biometric templates for the plurality of legitimate users, wherein the first secure sketch generator is configured to use first transformation parameters comprising a hash function to generate a corresponding protected biometric template in the plurality of protected biometric templates for each of the plurality of legitimate users by hashing the biometric template for the legitimate user. The plurality of protected biometric templates are then combined using a Merkle tree and a corresponding index value for each of the plurality of legitimate users to generate a common protected biometric template for the plurality of legitimate users. The common protected biometric template is inputted to a second secure sketch generator configured to use second transformation parameters comprising a physical unclonable function serving as a fingerprint of the design to generate a common obfuscation key from the common protected biometric template. Finally, the design is obfuscated using the common obfuscation key to generate a common bitstream, wherein the first transformation parameters, the second transformation parameters, the common bitstream, and the plurality of protected biometric templates are stored on the design.

In particular embodiments, a querying biometric template and a querying index value may be received originating from a querying user. In turn, a querying protected biometric template may be generated from the querying biometric template using the first transformation parameters stored on the design and a querying common protected biometric template may be identified using the Merkle tree, the querying protected biometric template, the querying index value, and one or more of the plurality of protected biometric templates stored on the design. Accordingly, a querying common obfuscation key may be generated applying the querying common protected biometric template to the second transformation parameters stored on the design and the design may be de-obfuscated by using the querying common obfuscation key to generate a querying common bitstream, wherein the design is activated in response to the querying common bitstream equaling the common bitstream.

According to an embodiment of the present disclosure, a method for configuring biometric access for a plurality of legitimate users to a design is provided. The method may include receiving a plurality of biometric templates, each biometric template originating from one of the plurality of legitimate users. The method may further include obtaining a protected biometric template for each of the plurality of biometric templates using a first secure sketch generator (SSG) and first transformation parameters. The method may further include determining a common protected biometric template for the plurality of legitimate users based at least in part on combining a plurality of protected biometric templates using a Merkle tree and a corresponding index value for each of the plurality of legitimate users. The method may further include causing the design to be obfuscated based at least in part on a common obfuscation key generated from the common protected biometric template using a second SSG and second transformation parameters. The design is configured to be de-obfuscated for a given legitimate user responsive to biometric input from the given legitimate user.

According to another embodiment of the present disclosure, an apparatus for configuring biometric access for a plurality of legitimate users to a design is provided. The apparatus includes at least one processor and a memory including computer executable instructions. The memory and the computer executable instructions may be configured to, with the at least one processor, cause the apparatus to at least receive a plurality of biometric templates, each biometric template originating from one of the plurality of legitimate users. The memory and the computer executable instructions may be further configured to obtain a protected biometric template for each of the plurality of biometric templates using a first secure sketch generator (SSG) and first transformation parameters. The memory and the computer executable instructions may be further configured to determine a common protected biometric template for the plurality of legitimate users based at least in part on combining a plurality of protected biometric templates using a Merkle tree and a corresponding index value for each of the plurality of legitimate users. The memory and the computer executable instructions may be further configured to cause the design to be obfuscated based at least in part on a common obfuscation key generated from the common protected biometric template using a second SSG and second transformation parameters. The design is configured to be de-obfuscated for a given legitimate user responsive to biometric input from the given legitimate user.

According to another embodiment of the present disclosure, a computer program product for configuring biometric access for a plurality of legitimate users to a design is provided. The computer program product includes at least one computer-readable storage medium having computer-readable program code portions stored therein. The computer-readable code portions may include executable portions configured to cause at least one processor to at least receive a plurality of biometric templates, each biometric template originating from one of the plurality of legitimate users. The computer-readable code portions may further include executable portions configured to cause the at least one processor to obtain a protected biometric template for each of the plurality of biometric templates using a first secure sketch generator (SSG) and first transformation parameters. The computer-readable code portions may further include executable portions configured to cause the at least one processor to determine a common protected biometric template for the plurality of legitimate users based at least in part on combining a plurality of protected biometric templates using a Merkle tree and a corresponding index value for each of the plurality of legitimate users. The computer-readable code portions may further include executable portions configured to cause the at least one processor to cause the design to be obfuscated based at least in part on a common obfuscation key generated from the common protected biometric template using a second SSG and second transformation parameters. The design is configured to be de-obfuscated for a given legitimate user responsive to biometric input from the given legitimate user.

According to yet another embodiment of the present disclosure, a method for configuring biometric access for a single user to a design is provided. The method may include receiving a biometric template originating from the single user. The method may further include obtaining a protected biometric template corresponding to the protected biometric template using a first SSG and first transformation parameters. The method may further include providing the protected biometric template to a second SSG configured to use second transformation parameters to generate an obfuscation key. The method may further include obfuscating the design based at least in part on receiving a bitstream representing obfuscated portions of the design, the bitstream generated from the obfuscation key.

According to yet another embodiment of the present disclosure, an apparatus for configuring biometric access for a single user to a design is provided. The apparatus includes at least one processor and a memory including computer executable instructions. The memory and the computer executable instructions may be configured to, with the at least one processor, cause the apparatus to receive a biometric template originating from the single user. The memory and the computer executable instructions may be further configured to, with the at least one processor, cause the apparatus to obtain a protected biometric template corresponding to the protected biometric template using a first SSG and first transformation parameters. The memory and the computer executable instructions may be further configured to, with the at least one processor, cause the apparatus to provide the protected biometric template to a second SSG configured to use second transformation parameters to generate an obfuscation key. The memory and the computer executable instructions may be further configured to, with the at least one processor, cause the apparatus to obfuscate the design based at least in part on receiving a bitstream representing obfuscated portions of the design, the bitstream generated from the obfuscation key.

According to yet another embodiment of the present disclosure, an apparatus for configuring biometric access for a single user to a design is provided. The apparatus includes at least one processor and a memory including computer executable instructions. The memory and the computer executable instructions may be configured to, with the at least one processor, cause the apparatus to receive a biometric template originating from the single user. The memory and the computer executable instructions may be further configured to, with the at least one processor, cause the apparatus to obtain a protected biometric template corresponding to the protected biometric template using a first SSG and first transformation parameters. The memory and the computer executable instructions may be further configured to, with the at least one processor, cause the apparatus to provide the protected biometric template to a second SSG configured to use second transformation parameters to generate an obfuscation key. The memory and the computer executable instructions may be further configured to, with the at least one processor, cause the apparatus to obfuscate the design based at least in part on receiving a bitstream representing obfuscated portions of the design, the bitstream generated from the obfuscation key.

According to yet another embodiment of the present disclosure, a computer program product for configuring biometric access for a single user to a design is provided. The computer program product includes at least one computer-readable storage medium having computer-readable program code portions stored therein. The computer-readable program code portions may include executable portions configured to cause at least one processor to receive a biometric template originating from the single user. The computer-readable program code portions may include executable portions configured to cause at least one processor to obtain a protected biometric template corresponding to the protected biometric template using a first SSG and first transformation parameters. The computer-readable program code portions may include executable portions configured to cause at least one processor to provide the protected biometric template to a second SSG configured to use second transformation parameters to generate an obfuscation key. The computer-readable program code portions may include executable portions configured to cause at least one processor to obfuscate the design based at least in part on receiving a bitstream representing obfuscated portions of the design, the bitstream generated from the obfuscation key.

BRIEF DESCRIPTION OF THE DRAWINGS

Figure 1A:
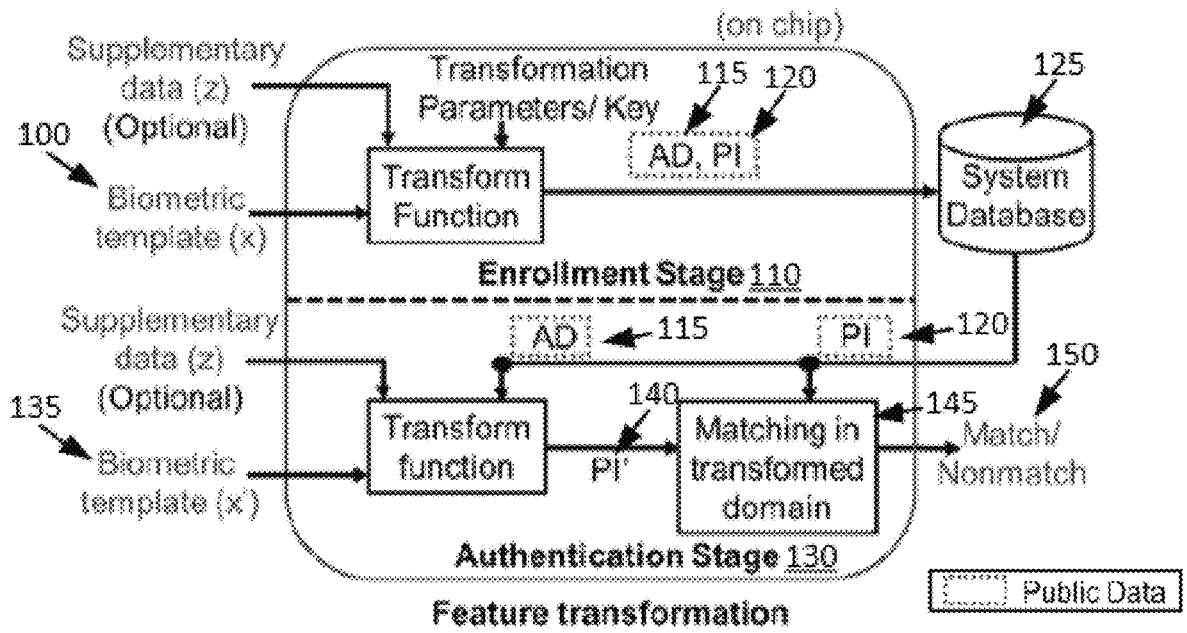
Figure 1B:
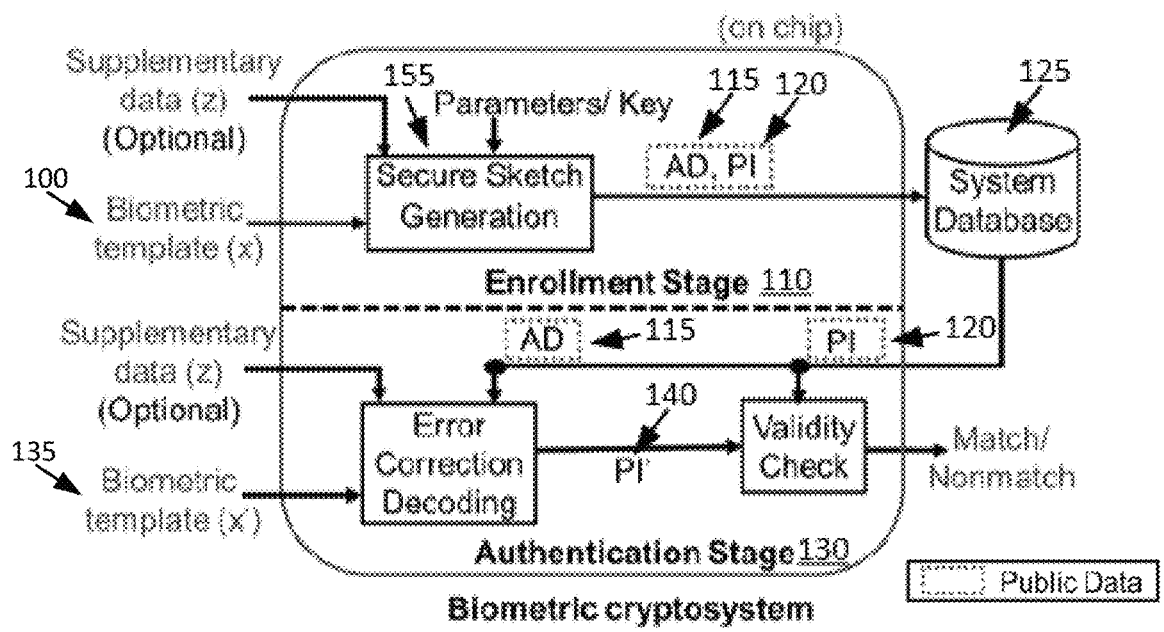
Figure 2:
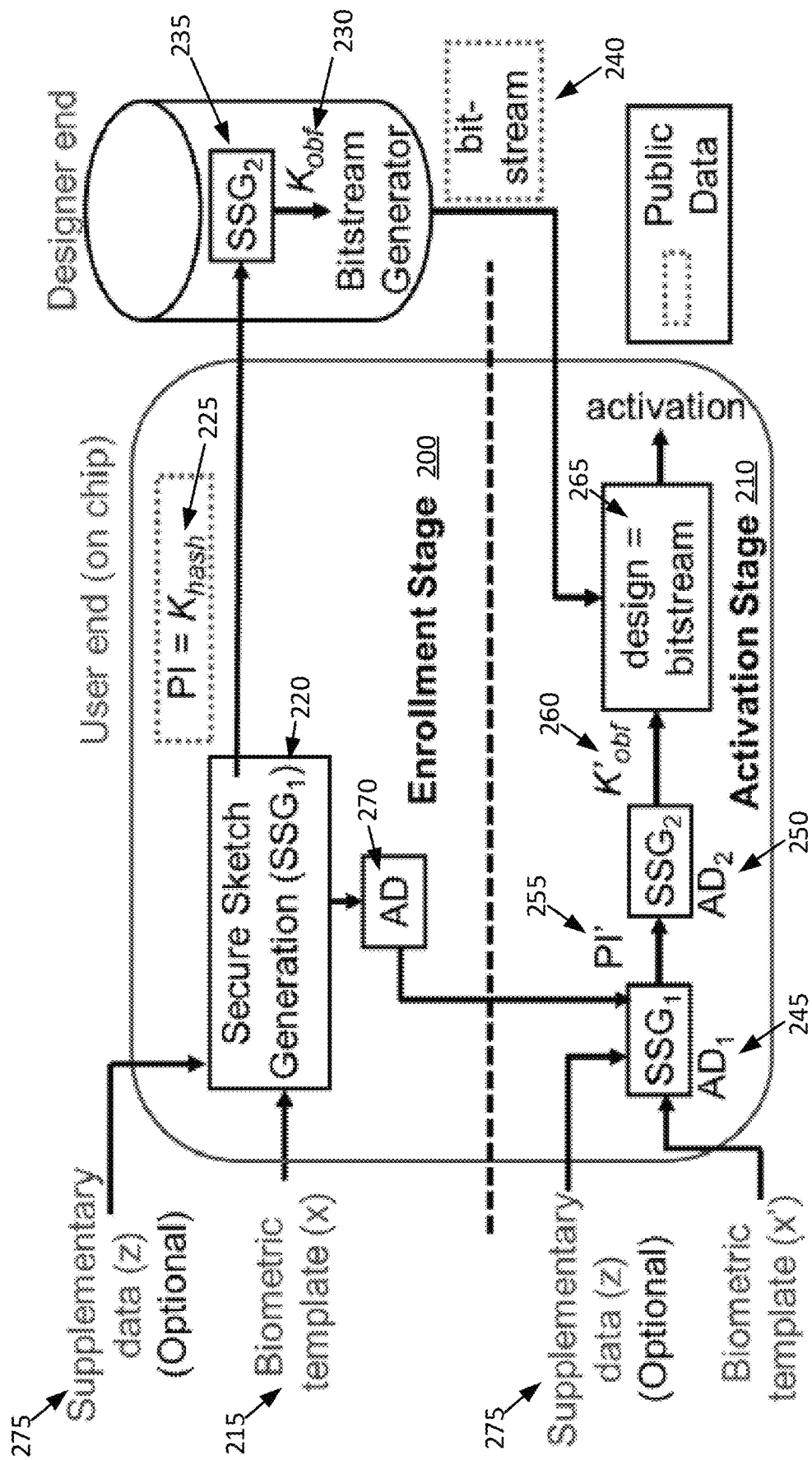
Figure 3:
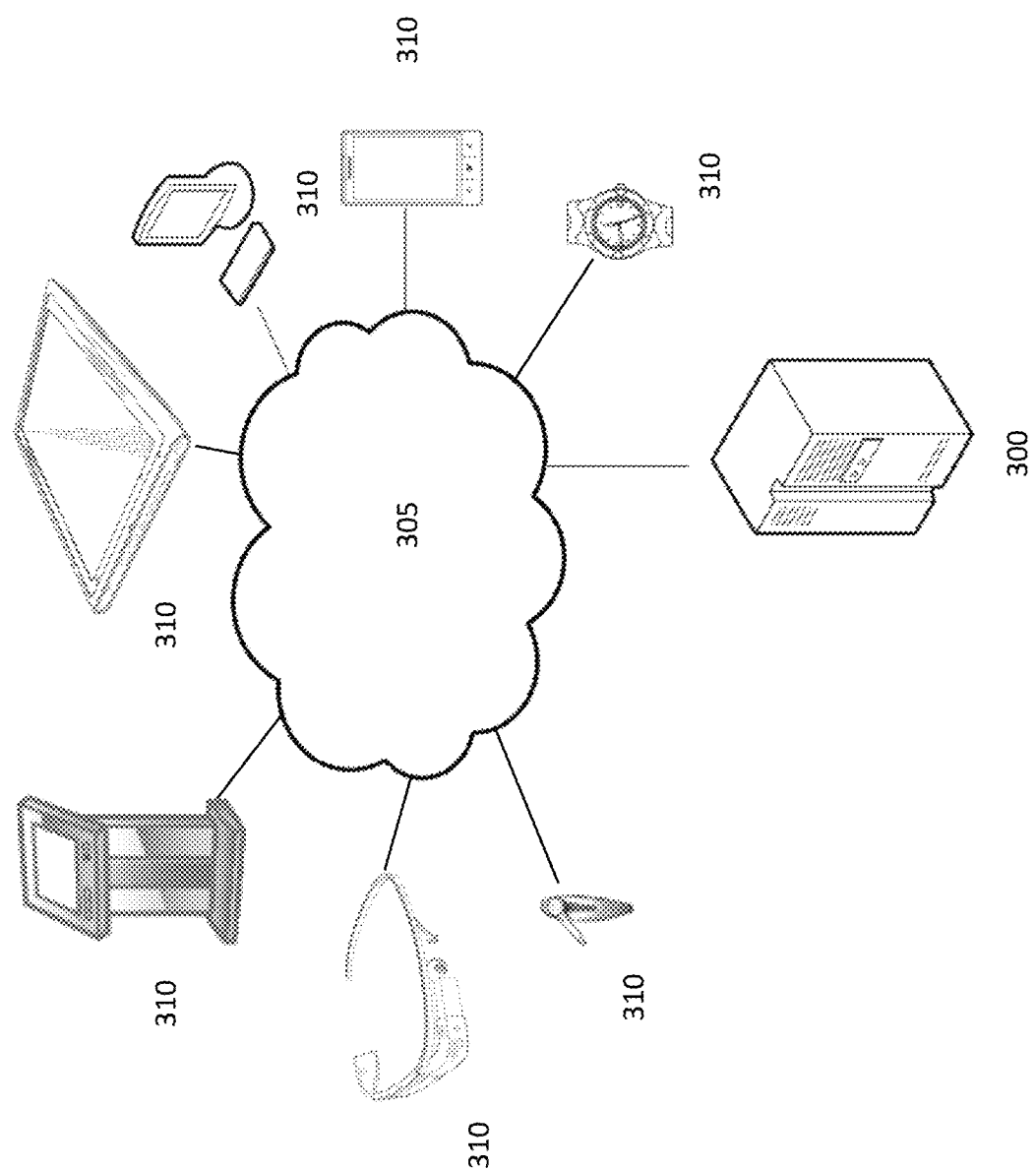
Figure 4:
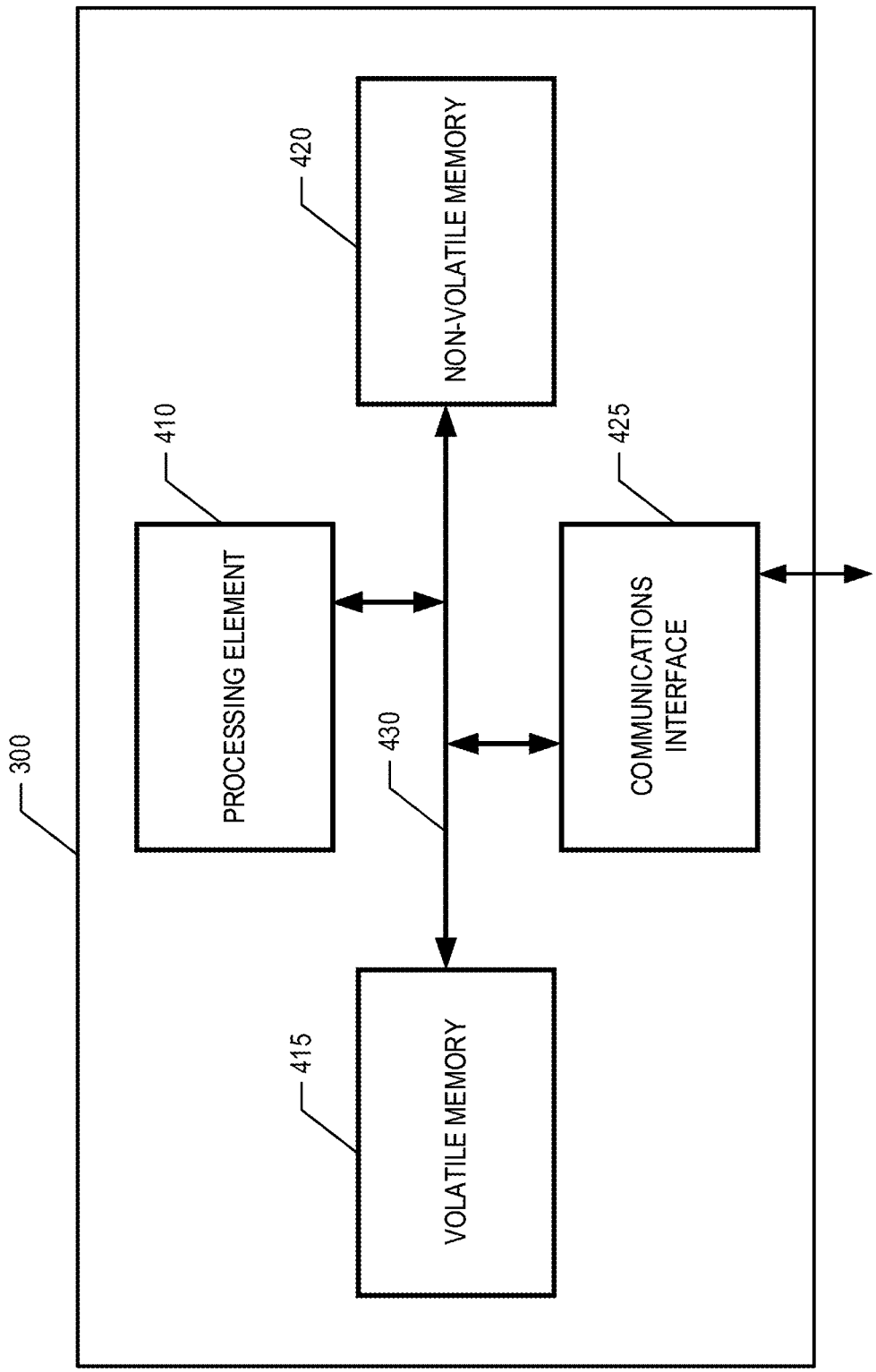
Figure 5:
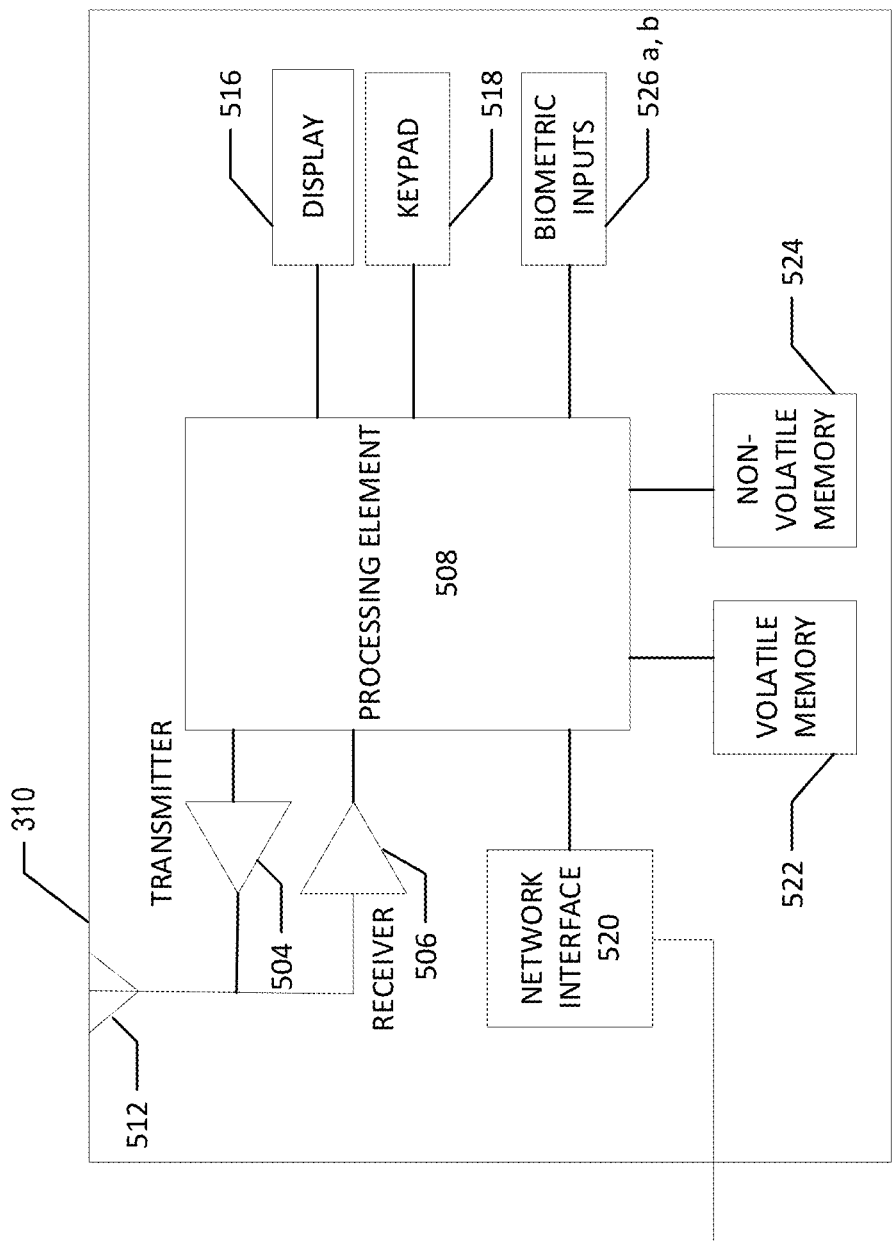
Figure 6:
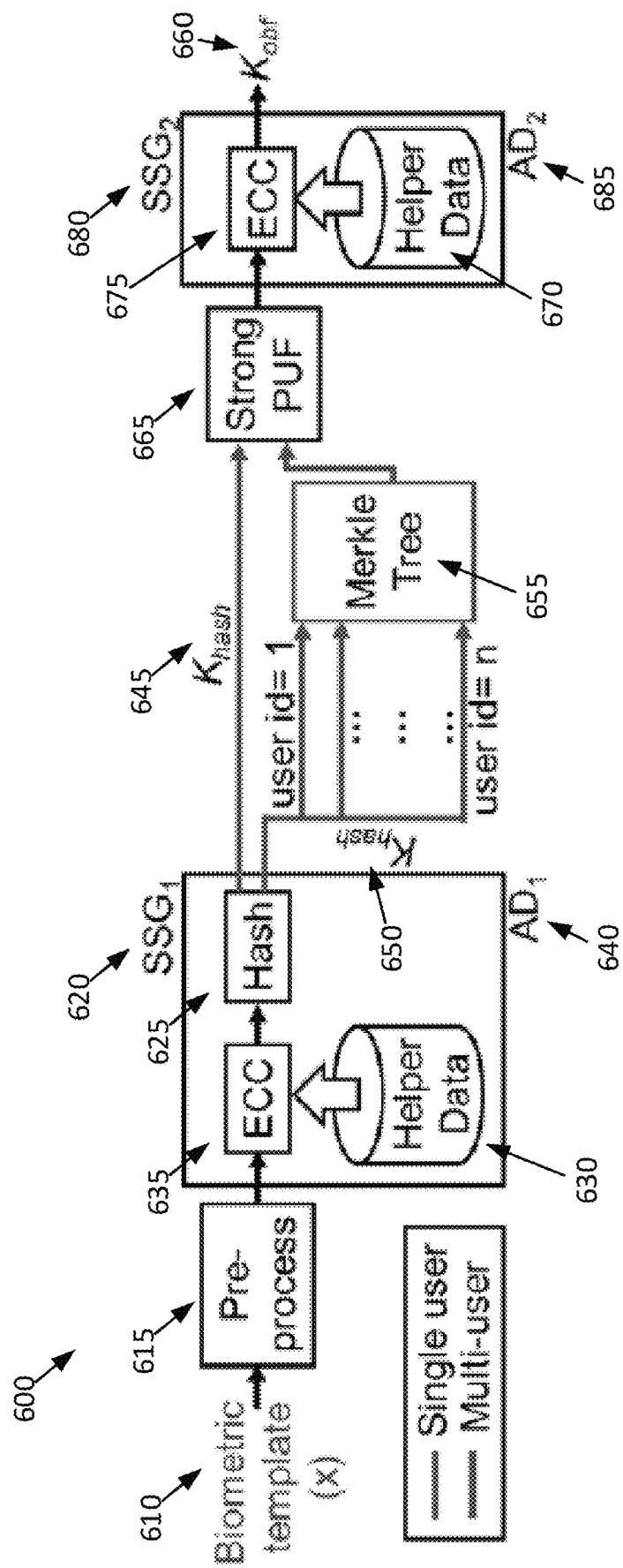
Figure 7:
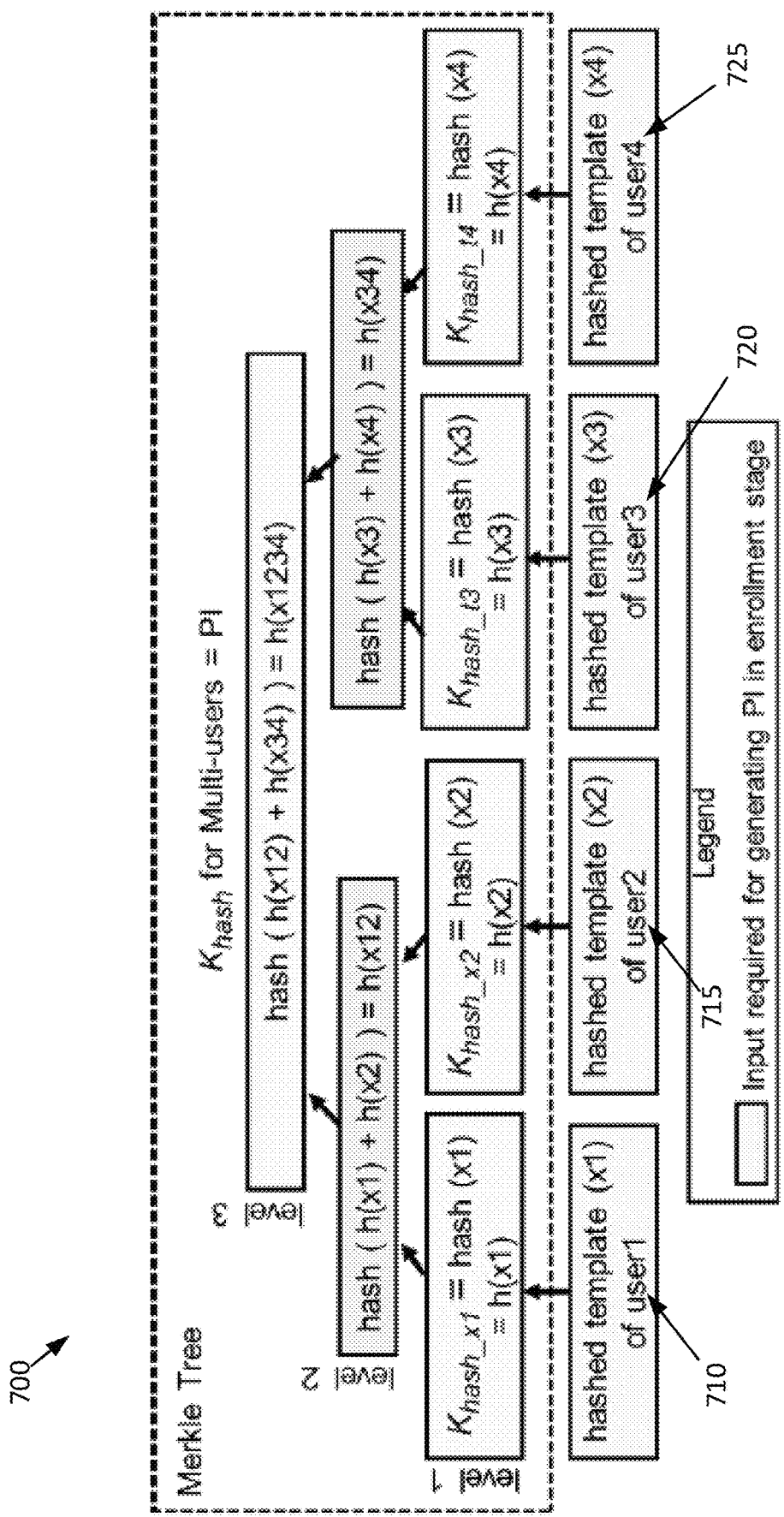
Figure 8:
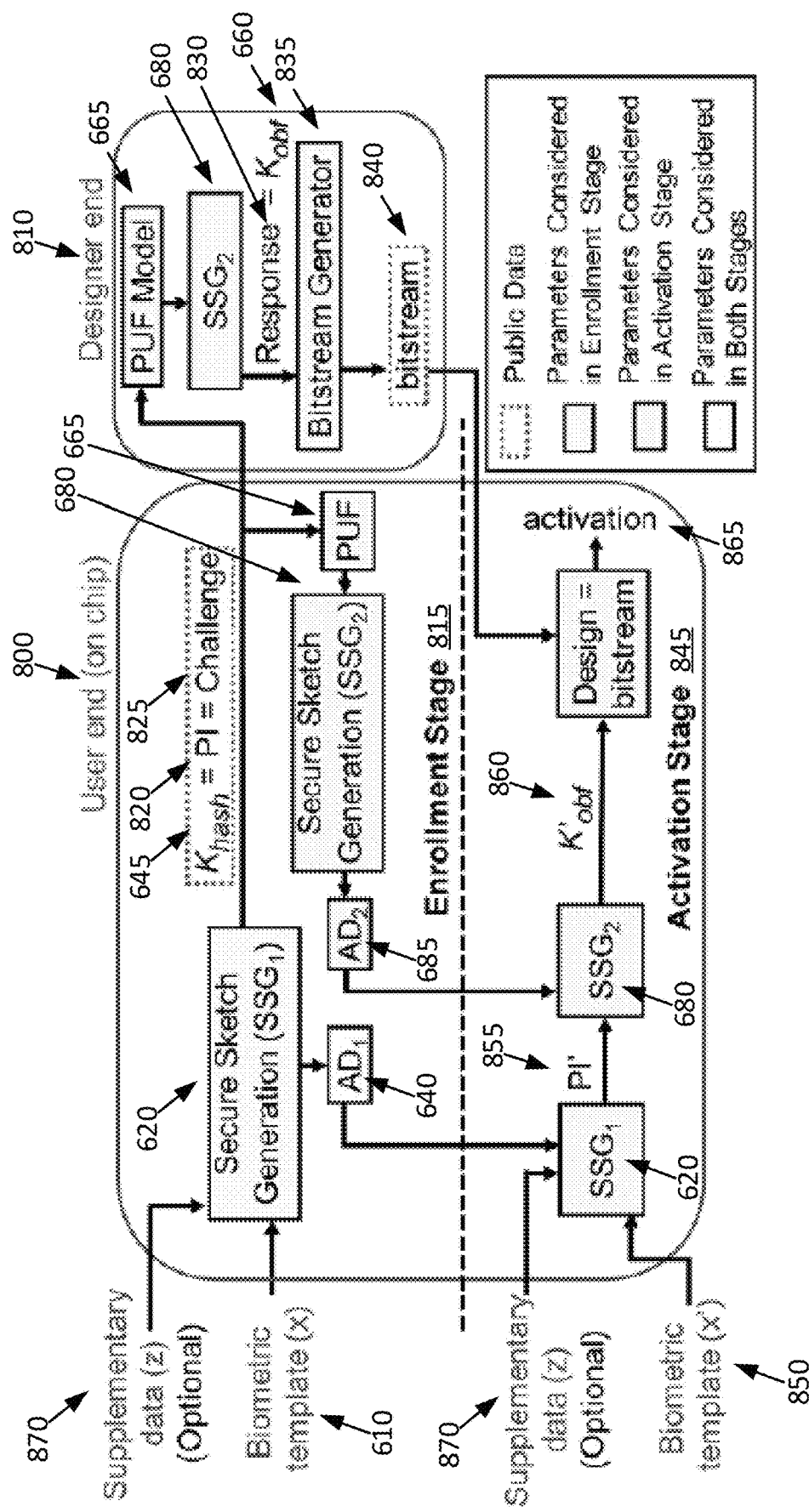
Figure 9:
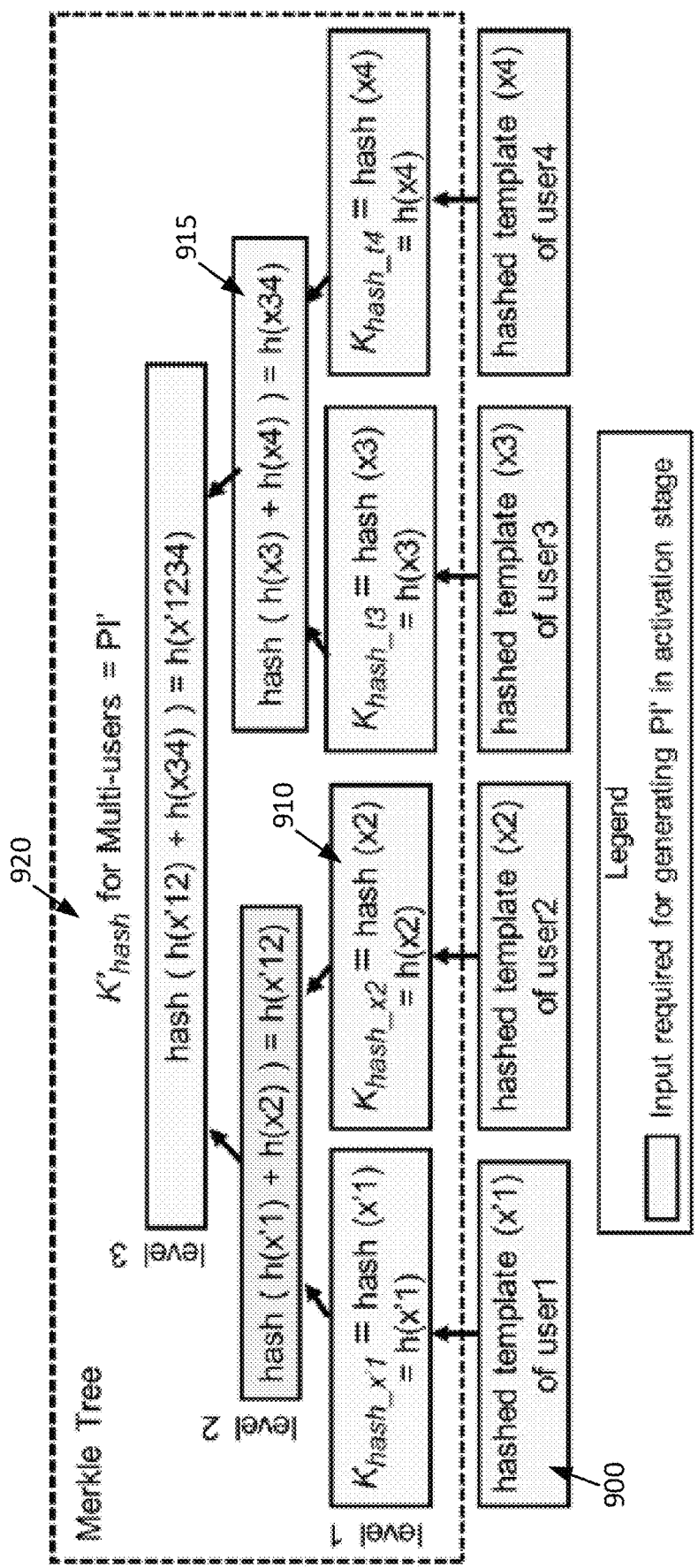
Figure 10:
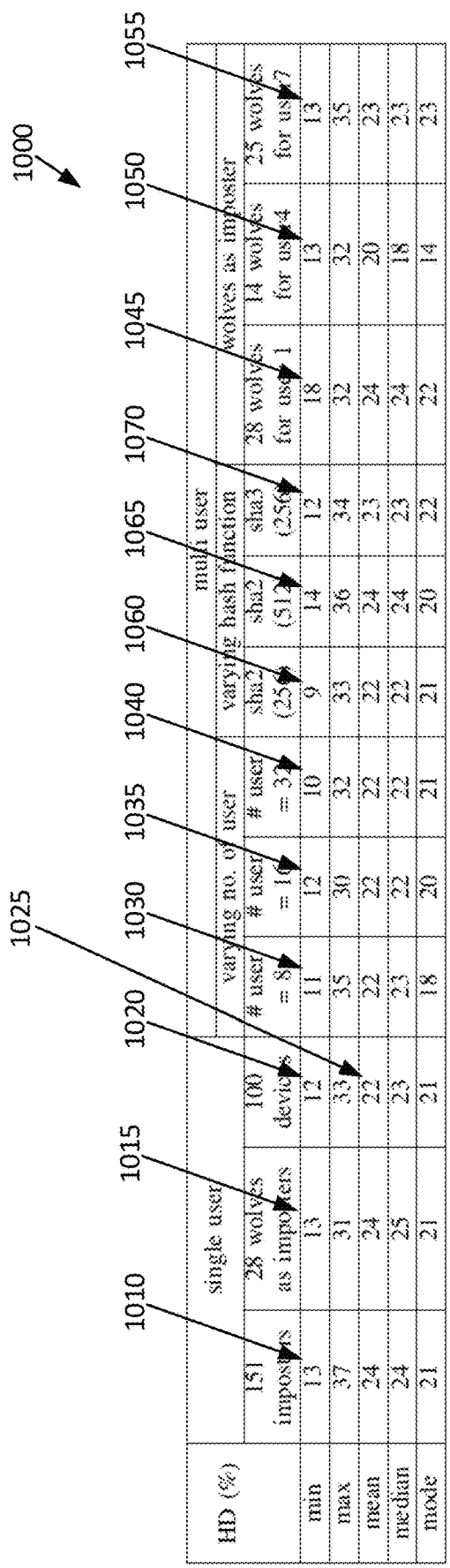
Figure 11:
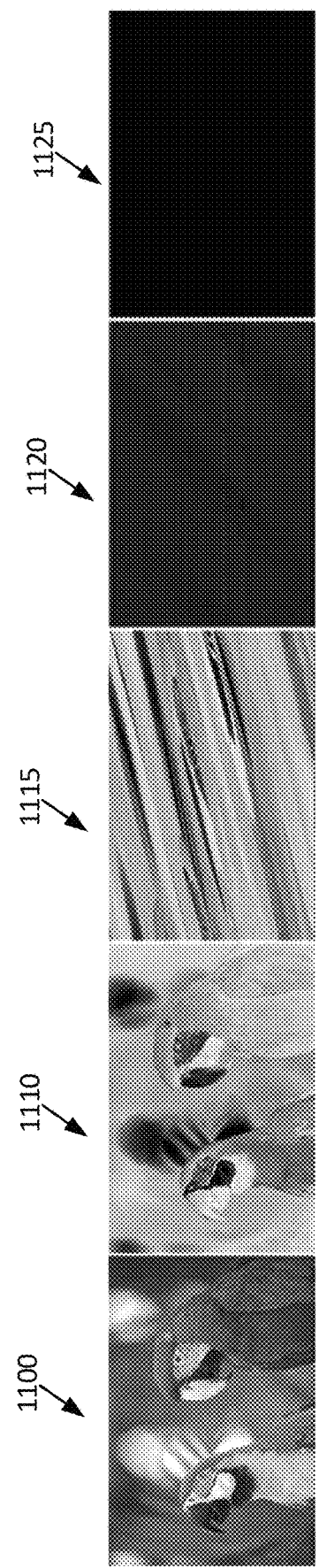

Having thus described the disclosure in general terms, reference will now be made to the accompanying drawings, which are not necessarily drawn to scale, and wherein:

FIGS. 1A and 1B provide process flows for two major biometric template protection approaches;

FIG. 2 provides a biometric-key-based obfuscation framework according to various embodiments of the present disclosure;

FIG. 3 is a diagram of a system architecture that may be used in conjunction with various embodiments of the present disclosure;

FIG. 4 is a schematic of a designer computing entity that may be used in conjunction with various embodiments of the present disclosure;

FIG. 5 is a schematic of a mobile computing entity that may be used in conjunction with various embodiments of the present disclosure;

FIG. 6 provides a process flow for generating keys from biometrics in accordance with various embodiments of the present disclosure;

FIG. 7 provides an example of a Merkle tree implemented for generating a pseudonymous identifier in the enrollment state in accordance with various embodiments of the present disclosure;

FIG. 8 provides a process flow for enrollment and activation in accordance with various embodiments of the present disclosure;

FIG. 9 provides an example of a Merkle tree implemented for generating a pseudonymous identifier in the activation stage in accordance with various embodiments of the present disclosure;

FIG. 10 displays a table showing comparison between output patterns of querying user with enrolled user(s) in terms of the Hamming distance; and FIG. 11 displays images visualizing the effect of wrong obfuscation keys in output produced in accordance with various embodiments of the present disclosure.

DETAILED DESCRIPTION OF VARIOUS EMBODIMENTS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application.

The term "comprising" means including but not limited to, and should be interpreted in the manner it is typically used in the patent context. The phrases "in one embodiment," "according to one embodiment," and the like, generally mean that the particular feature, structure, or characteristic following the phrase may be included in at least one embodiment of the present disclosure, and may be included in more than one embodiment of the present disclosure (importantly, such phrases do not necessarily refer to the same embodiment). If the specification describes something as "exemplary" or an "example," it should be understood that refers to a non-exclusive example. The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

I. General Overview and Exemplary Technical Advantages

Various embodiments of the present disclosure are directed to a novel approach for providing biometric access control, which may be referred to as Biometric Locking by Obfuscation, Physical Unclonable Keys, and Reconfigurability (BLOcKeR). Accordingly, various embodiments provide a framework that involves combining biometrics with two hardware security primitives, hardware obfuscation and physical unclonable functions (PUFs), in order to provide tamper protection to the hardware design and at the same time protection to the templates. Hardware obfuscation refers to the "locking" of the actual functionality of a design or physical implementations thereof as a chip (e.g., an integrated circuit (IC), a field-programmable gate array (FPGA), an application-specific integrated circuit (ASIC)), a device, a system, and/or the like by using a key where the locked design can again be unlocked by providing the right key. IN some examples, the design may be a gate-level design. On the other hand, a physical unclonable function (PUF) is a physical object used for generating a fingerprint of a hardware device/system. Oftentimes, consideration of the biometric template for the key generation is highly important. Although it can be tempting to simply use a non-biometric secret key (e.g. password) as traditionally practiced, the secret key has to be stored in non-volatile memory, which can make it vulnerable to physical attacks, such as attacks via scanning electron microscope (SEM). Therefore, in various embodiments, the framework is configured to consider biometric templates from individuals to generate the keys during functioning to reduce the risk of such attacks.

Unlike many conventional biometric approaches that perform authentication, various embodiments of the framework aim at ensuring successful "activation" of a locked system by again leveraging the biometric properties of a genuine user, as well as the fingerprint of the device. In addition, various embodiments provide several attack resistance properties. First, in particular embodiments, the biometric template is never stored in a raw format on a server and/or device/card. Instead, embodiments of the framework are configured to generate a unique key for each system, which has irreversible (also referred to herein interchangeably as noninvertible), unlinkable (also referred to herein interchangeably as nonlinkable) and revocable properties (also referred to herein interchangeably as renewability).

The irreversibility property implies the original biometric input should be computationally difficult, thus enhancing the security of the system. The unlinkability property deals with preserving the privacy of a user. If a protected template has a unlinkability property, then cross-matching or linking multiple templates of a user (collected for the same biometric trait, but from different applications or systems) becomes computationally difficult. Finally, the revocability property involves making the process of obtaining the original biometric input of a user from her multiple protected templates (collected from the same biometric trait) difficult. Therefore, if a biometric database used in storing the protected templates is ever compromised, the attacker cannot obtain the original template and the user can easily revoke the stolen template(s) and reissue new template(s). There are numerous biometric systems employed for access control, but consideration of template protection schemes in those systems are limited.

In contrast to conventional biometric systems, various embodiments of the framework have an advantage of not implementing a "matching" scheme, and as a result, these embodiments may avoid attacks that are made on matching modules. Instead, embodiments of the framework make use of hardware obfuscation to "lock" the hardware from the gates up to the firmware such that the hardware does not behave properly without a biometric-dependent key. In addition, various embodiments of the framework are configured to bind the device with the owner/user through one or more PUFs. Thus, the user's biometric will only unlock the specific system in which she is enrolled. Further, aside from a secure hash function, implementations of various embodiments of the framework do not require encryption/decryption primitives. Furthermore, various embodiments of the framework can attain revocability by optionally adding supplementary data independent of a biometric template (e.g., such as a password) while generating the secure signature from the template, Such functionality can allow renewing or revoking a new secure signature for the same user by updating the supplementary data. Finally, various embodiments of the framework offer other advantages such as system anti-reverse engineering and configurability, which can be used to lower design overheads.

A protected biometric template normally includes two components: a pseudonymous identifier (PI) and auxiliary data (AD). A PI is the protected template itself obtained from the original biometric input. AD includes system parameters or values that are used to protect the biometric input. Based on how the components are generated, legacy template protection schemes are broadly classified into two major categories: (i) feature transformation approaches, and (ii) biometric cryptosystems. Similar to any general biometric system, both approaches function in two stages: enrollment and authentication, as explained briefly below.

For a legacy biometric access control system, once the input biometric template (x) 100 is received from a user, the enrollment stage 110 of feature transformation begins with applying the transformation parameters (AD) 115 on the biometric template (x) 100 to generate the protected biometric template (PI) 120 as shown in FIG. 1A. Both the transformation parameters (AD) 115 and protected biometric template (PI) 120 are stored in a system database 125 at this stage 110. During the authentication stage 130, when a biometric template (x') 135 is queried, the transformation parameters (AD) 115 are retrieved from the system database 125 and applied on the biometric template (x') 135 in the same way that the original biometric template (x) 100 was transformed. After the transformation, another protected template (PI') 140 is constructed and compared to original protected template (PI) 120 (constructed in the enrollment stage 110) using a matcher module 145. Based on the match/no-match result 150 (e.g., a binary output, a quantitative/probabilistic output), the query template 135 is authenticated, and access is granted. Since the transformation parameters (AD) 115 are public, it is possible to retrieve the original biometric template (x) 100 from the protected biometric template (PI) 120 utilizing the transformation parameters (AD) 115, and as a result, the desired non-invertibility requirement can be violated.

To tackle this, non-invertible feature transformation techniques may be implemented, where retrieving the biometric template (x) 100 from the transformation parameters (PI) 115 is computationally hard or impossible (e.g., non-invertible feature transformation using cancelable biometrics). However, some of these techniques exhibit poor recognition performance in practice, and therefore, are not considered applicable as a template protection scheme.

On the other hand, the enrollment stage 110 of biometric cryptosystems shown in FIG. 1B involves a secure sketch generator (SSG) 155 as the transformation parameters (AD) 115. The secure sketch generator (SSG) 155 either produces the cryptographic hash of the biometric template (x) 100 or error corrects the biometric template (x) 100 and derives a codeword/key from the template (x) 100. The final message derived at the output of this secure sketch generator (SSG) 155 is considered as the protected biometric template (PI) 120. Both the transformation parameters (AD) 115 and protected template (PI) 120 are again stored in a database 125. During the authentication stage 130, the queried biometric template (x') 135 goes through the same procedure as that of original biometric template (x) 100, and another protected template (PI') 140 is generated. After that, the original protected template (PI) 120 and the generated protected template (PI') 140 are compared to decide whether queried biometric template (x') 135 is authenticated.

However, these legacy systems can often suffer from non-invasive, semi-invasive, and invasive attacks on various modules of the systems, such as, for example, the system database 125. In most of the cases, the purpose of a system database attack is to either steal or recover the template or achieve unauthorized card and/or device access. However, if a biometric system equipped with a proper template protection scheme comes under attack, there is less chance of success for the attackers as irreversibility can prevent them from recovering and/or reconstructing the templates. Moreover, unlinkability can prohibit attackers from making links between multiple templates of a user that are used in different applications. In addition, revocability can reinforce the control in an adverse environment by abandoning the attacked template as well as allowing a user to issue a new template.

However, countermeasures for template protection embedded in legacy biometric access control systems can be extremely limited because of the transformation parameters (AD), protected biometric template (PI), or both being public and/or stored in a database. Accordingly, the most common instantiation of a legacy biometric access control system involves a match-on server, in which the templates exist on a centralized server where they are susceptible to theft or modification by invasive attacks and semi-invasive attacks. While an alternative instantiation of a legacy biometric access control system involves a match-on card, in which biometric templates are kept locally on the card/device where they are susceptible to physical attacks (e.g., micro-probing, side-channel attacks, and/or the like), that can be used to extract the templates and/or encryption keys from the card/device. Furthermore, match-on card/devices are also vulnerable to other attacks on software and hardware implementations that bypass and/or override matching schemes. Thus, multiple modules of many legacy biometric access control systems and their corresponding interfaces are oftentimes at a risk of compromise.

Even when encryption is considered, various side-channel techniques (e.g., power leakage during computation) can be applied by attackers to extract secret cryptographic keys to find critical information on an encrypted biometric template. Various template protection schemes have been proposed to attempt to address this, such as salting and non-invertible transform. Salting is a template protection approach in which the biometric features are transformed using a function defined by a user-specific key. However, if this user-specific key is compromised, the template is no longer secure because the transformation is usually invertible. Non-invertible transformation refers to a one-way function, which is easy to compute but hard to invert. The main drawback of this approach is the tradeoff between the discriminability and non-invertibility of the transformation function.

Accordingly, various embodiments of the disclosure described herein address several of the technical challenges of legacy biometric access control systems just described. Specifically, various embodiments described herein not only secure a design implemented on a hardware platform, but also provide template protection. The main building blocks according to various embodiments are depicted in FIG. 2. Like other popular biometric access control frameworks, various embodiments have an enrollment stage 200. However, rather than having an authentication stage, embodiments of the framework make use an activation stage 210, where the obfuscated design is unlocked. More specifically, during the enrollment stage 200, the user provides her biometric template (x) 215, and a secure sketch generator ($SSG_1$ 220) in particular embodiments generates a protected biometric template (PI), which is a hashed version of the template ($K_{hash}$ 225). The hashed version of the template ($K_{hash}$ 225) is then sent to a designer end that generates an obfuscation key ($K_{obf}$ 230) from the hashed version of the template ($K_{hash}$ 225) using the fingerprint of the design (device) illustrated by $SSG_2$ 235 and obfuscates the design with the obfuscation key ($K_{obf}$) 230.

Then, a locked bitstream or firmware 240 is then sent to the user. At the activation stage 210, using the parameters from $SSG_1$ 220 as transformation parameters ($AD_1$) 245 and the parameters of $SSG_2$ 235 as transformation parameters ($AD_2$) 250, various embodiments regenerate a protected biometric template (PI') 255 and obfuscation key ($K'_{obf}$ 260) respectively. Then finally, the design (device) is unlocked 265 (i.e., successfully activated) by applying the obfuscation key ($K'_{obf}$) 260. Accordingly, the design will only work correctly if all bits of the obfuscation key ($K'_{obf}$) 260 are the same as the original obfuscation key ($K_{obf}$) 230.

Accordingly, if any data is (1) stored on a chip, which is only in possession of the user, (2) not shared over any communication channel, and (3) not stored in any external database, then the data is considered secure and not public. Therefore, the transformation parameters (AD) 270 in various embodiments of the framework are considered to be such data since they are not public, thus in practice, making it is difficult for the protected biometric template (PI=$K_{hash}$ 225) and obfuscation key ($K_{obf}$) 230 to be compromised.

Furthermore, if a compromise does occur due to an attack and the protected biometric template (PI) is somehow exposed to an unauthorized person, supplementary data (z) 275 can be used in particular embodiments to assist a legitimate user in regaining access to the design. In these particular embodiments, once a compromise has occurred, the legitimate user can cancel her current enrollment, and then re-enroll with anew obfuscation key ($K_{obf}$) 230 that the unauthorized person does not know. Here, since the enrollment depends on the protected biometric template (PI) 225 as well as the obfuscation key ($K_{obf}$) 230, the legitimate user may be required to generate a new protected template (PI) for re-enrollment. The generation of protected template (PI) mainly relies on two inputs: biometric input (x) 215 of the user and the supplementary data (z) 275 (e.g., any data that is independent of the biometric input (x) 215 such as a password). Therefore, although it may be difficult for the user to create a new biometric template, the user can typically create new supplementary data without difficulty. Thus, in various embodiments, the user is able to generate a new protected template (PI), as well as a new obfuscation key ($K_{obf}$) 230, by generating new supplementary data (z) 275 and combining such data 275 with the existing biometric input (x) 215. As a result, the user may then re-enroll by using the new obfuscation key ($K_{obf}$) 230 and in this way, gain back control of the design. Accordingly, since the supplementary data (z) 275 allows for the user to re-issue a new protected biometric template (PI) when needed, various embodiments of the disclosure meet the revocability requirement found in template protection guidelines.

Thus, various embodiments of framework can provide several advantages over many legacy biometric access control systems that are prone to template theft and/or recovery and unauthorized card and/or device access. For instance, many biometric access control systems contain a matcher module in which an attacker can simply override the result declared by the module to gain access. However, various embodiments of the framework resist such an attack since they make no use of a matcher module. Instead, unlocking (activation) only succeeds if the correct key is derived from the user's biometric and a PUF. In addition, various embodiments of the framework are resistant to a hill-climbing attack due to the absence of a matching score. Furthermore, Generative Adversarial Networks (GANs) are also inapplicable with respect to various embodiments of the framework since such an adversarial network requires some score feedback from a matching module's output.

In addition, since various embodiments of the framework do not require raw, quantized, and/or encrypted versions of a user's template to be stored, attackers are unable to extract the user's original template. Instead, in particular embodiments, a modified template, PI, is constructed using a collision free hash function. Therefore, even if an attacker gains access to the modified template PI, she is not able to reverse the template PI back to the original template, which denotes embodiments having an irreversibility property.

Further, the transformation parameters (AD) used in various embodiments of the framework are not made public. Therefore, attackers cannot take advantage of the transformation parameters (AD) to find links among multiple templates of a user. Furthermore, the mechanisms used in various embodiments such as the involvement of cryptographic hash functions also help to stop attackers from looking for links among the multiple templates of the same user. Finally, incorporation of supplementary data in particular embodiments of the framework allows for users to reissue new protected biometric templates (PIs) if a compromise occurs, confirming the revocability of these embodiments.

II. Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

A. Exemplary System Architecture

FIG. 3 provides an illustration of an exemplary system architecture that may be used in accordance with various embodiments of the present disclosure. As shown in FIG. 3, the architecture may include one or more designer computing entities 300, one or more networks 305, and one or more user computing entities 310. Each of these components, entities, devices, systems, and similar words used herein interchangeably may be in direct or indirect communication with, for example, one another over the same or different wired or wireless networks. Additionally, while FIG. 3 illustrates the various system entities as separate, standalone entities, the various embodiments are not limited to this particular architecture.

Generally, designer computing entities 300 and user computing entities 310 may communicate over networks 305 to biometrically lock designs, or to configure biometric access for legitimate users to the design. In some examples, a design that is locked is a user computing entity 310; that is, a user computing entity 310 may be configured to set up biometric access for one or more legitimate users to the user computing entity 310 itself. For a user computing entity 310 to set up biometric access to itself, the user computing entity 310 may communicate with one or more designer computing entities 300. As previously discussed in the context of FIG. 2, communication over networks 305 between a user computing entity 310 (e.g., "user end (on chip)") and a designer computing entity 300 (e.g., "designer end") may include the user computing entity 310 providing a protected biometric template (e.g., $K_{hash}$) 225 and the designer computing entity 300 providing a bitstream to the user computing entity 310 for obfuscation of the user computing entity 310. Various embodiments of the present disclosure provide various technical advantages in reducing the amount of sensitive and secure data that is transmitted over networks 305 between a user computing entity 310 and a designer computing entity 300, as described above.

B. Exemplary Designer Computing Entity

FIG. 4 provides a schematic of a designer computing entity 300 that can be used in conjunction with various embodiments of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the designer computing entity 300 shown in FIG. 4 may be embodied as a plurality of computing entities, tools, and/or the like operating collectively to perform one or more processes, methods, and/or steps. As just one non-limiting example, the designer computing entity 300 may comprise a plurality of individual data tools, each of which may perform specified tasks and/or processes.

Depending on the embodiment, the designer computing entity 300 may include one or more network and/or communications interfaces 425 for communicating with various computing entities, such as by communicating data, content, information, and/or similar terms used herein interchangeably that can be transmitted, received, operated on, processed, displayed, stored, and/or the like. Thus, in certain embodiments, the designer computing entity 300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the designer computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The designer computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the designer computing entity 300 includes or is in communication with one or more processing elements 410 (also referred to as processors, processing circuitry, and/or similar terms used herein interchangeably) that communicate with other elements within the designer computing entity 300 via a bus 430, for example, or network connection. As will be understood, the processing element 410 may be embodied in several different ways. For example, the processing element 410 may be embodied as one or more complex programmable logic devices (CPLDs), microprocessors, multi-core processors, coprocessing entities, application-specific instruction-set processors (ASIPs), and/or controllers. Further, the processing element 410 may be embodied as one or more other processing devices or circuitry. The term circuitry may refer to an entirely hardware embodiment or a combination of hardware and computer program products. Thus, the processing element 410 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 410 may be configured for a particular use or configured to execute instructions stored in volatile or non-volatile media or otherwise accessible to the processing element 410. As such, whether configured by hardware, computer program products, or a combination thereof, the processing element 410 may be capable of performing steps or operations according to embodiments of the present disclosure when configured accordingly.

In various embodiments, the designer computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 420 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 420 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 420 may also be embodied as a data storage device or devices, as a separate database server or servers, or as a combination of data storage devices and separate database servers. Further, in some embodiments, the memory media 420 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the designer computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 415 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 415 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 410. Thus, the databases, database instances, database management system entities, data, images, applications, programs, program modules, scripts, source code, object code, byte code, compiled code, interpreted code, machine code, executable instructions, and/or the like may be used to control certain aspects of the operation of the designer computing entity 300 with the assistance of the processing element 410 and operating system.

Although not shown, the designer computing entity 300 may include or be in communication with one or more input elements, such as a keyboard input, a mouse input, a touch screen/display input, motion input, movement input, audio input, pointing device input, joystick input, keypad input, and/or the like. The designer computing entity 300 may also include or be in communication with one or more output elements (not shown), such as audio output, video output, screen/display/interface output, motion output, movement output, and/or the like.

As will be appreciated, one or more of the computing entity's components may be located remotely from other computing entity components, such as in a distributed system. Furthermore, one or more of the components may be aggregated and additional components performing functions described herein may be included in the designer computing entity 300. Thus, the designer computing entity 300 can be adapted to accommodate a variety of needs and circumstances.

C. Exemplary User Computing Entity

FIG. 5 provides an illustrative schematic representative of a user computing entity 310 that can be used in conjunction with various embodiments of the present disclosure. In various embodiments, the user computing entity 310 may be any mobile device, kiosk, tablet, computing device, and/or the like comprising and/or in communication with one or more biometric input components/elements 526 a, b that are configured to receive one or more biometric inputs (e.g., a fingerprint scanner, hand print scanner, palm print scanner, microphone for use in voice recognition, camera for use in iris/retina, facial recognition, vein pattern recognition, signature recognition, hand geometry) from multiple users and provide the biometric inputs and/or indications thereof. In one embodiment, the one or more biometric input components/elements 526 a, b may be configured to receive multiple biometric inputs from multiple users simultaneously or within a configurable time period.

As shown in FIG. 5, the user computing entity 310 can include an antenna 512, a transmitter 504 (e.g., radio), a receiver 506 (e.g., radio), and a processing element 508 that provides signals to and receives signals from the transmitter 504 and receiver 506, respectively. The signals provided to and received from the transmitter 504 and the receiver 506, respectively, may include signaling information/data in accordance with an air interface standard of applicable wireless systems to communicate with various devices, such as a designer computing entity 300, another user computing entity 310, and/or the like. In an example embodiment, the transmitter 504 and/or receiver 506 are configured to communicate via one or more SRC protocols. For example, the transmitter 504 and/or receiver 506 may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna 512, transmitter 504, and receiver 506 may be configured to communicate via one or more long range protocols, such as GPRS, UMTS, CDMA200, 1xRTT, WCDMA, GSM, EDGE, TD-SCDMA, LTE, E-UTRAN, EVDO, HSPA, HSDPA, Wi-Fi, Wi-Fi Direct, WiMAX, and/or the like.

In this regard, the user computing entity 310 may be capable of operating with one or more air interface standards, communication protocols, modulation types, and access types. More particularly, the user computing entity 310 may operate in accordance with any of a number of wireless communication standards and protocols. In a particular embodiment, the user computing entity 310 may operate in accordance with multiple wireless communication standards and protocols, such as GPRS, UMTS, CDMA200, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 310 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 310 can also download changes, add-ons, and updates, for instance, to its firmware, software (e.g., including executable instructions, applications, program modules), and operating system.

In addition, the user computing entity 310 may include one or more network and/or communications interfaces 520 for communicating with various computing entities, such as by communicating data, content, information, and/or similar terms used herein interchangeably that can be transmitted, received, operated on, processed, displayed, stored, and/or the like. The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

According to one embodiment, the user computing entity 310 may include location determining aspects, devices, modules, functionalities, and/or similar words used herein interchangeably. For example, the user computing entity 310 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the authentication computing entity's 30 position in connection with a variety of other systems, including cellular towers, Wi-Fi access points, and/or the like. Similarly, the user computing entity 310 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing entities (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The user computing entity 310 may also comprise a user interface comprising one or more user input/output interfaces (e.g., a display 516 and/or speaker/speaker driver coupled to a processing element 508 and a touch screen, keyboard, mouse, and/or microphone coupled to a processing element 508). For example, the user interface may be configured to provide an application, browser, interactive user interface, dashboard, webpage, and/or similar words used herein interchangeably executing on and/or accessible via the user computing entity 310 to cause display or audible presentation of information/data and for user interaction therewith via one or more user input interfaces. Moreover, the user interface can comprise or be in communication with any of a number of devices allowing the user computing entity 310 to receive data, such as a keypad 518 (hard or soft), a touch display, voice/speech or motion interfaces, scanners, readers, or other input device. In embodiments including a keypad 518, the keypad 518 can include (or cause display of) the conventional numeric (0-9) and related keys (#, *), and other keys used for operating the user computing entity 310 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 310 can capture, collect, store information/data, user interaction/input, and/or the like.

In various example embodiments, the user computing entity 310 may comprise one or more biometric input components/elements 526 a, b for receiving multiple biometric inputs simultaneously or within a configurable time period. For example, the user computing entity 310 may comprise a touch sensitive region and/or display for capturing fingerprint scans, in an example embodiment. In another example, the user computing entity 310 may comprise cameras and/or image capturing devices for capturing images for performing iris and/or face authentication. In another example, the user computing entity 310 may comprise microphones for capturing voice samples for voice recognition. As should be understood, the user computing entity 310 may comprise various biometric input components/elements 526 a, b for receiving biometric input from multiple users, for example, for authenticating a transaction or for unlocking a design or device.

The user computing entity 310 can also include volatile storage or memory 522 and/or non-volatile storage or memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 310.

III. Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

A. Enrollment

The goal of the enrollment is to generate a key from the user's template and perform hardware obfuscation of the design (and/or physical manifestations thereof as a device or system) using the key. Hardware obfuscation is a technique used for locking system functionality at the hardware level using a "key." In order to activate the system, one has to provide the correct key to de-obfuscate/unlock it. Since the same key is used for both obfuscating and de-obfuscating the device, the key is referred to as an obfuscation key or in short "$K'_{obf}$." In various embodiments, the enrollment process entails obfuscating the design for legitimate user(s) using obfuscation key(s) ($K_{obf}(s)$) derived from the biometric template(s) of the user(s). To complete the enrollment process, two secure sketch generators are required in various embodiments. Details about each of the blocks/operations and the process are given below.

The enrollment process 600 for generating the obfuscation key(s) ($K_{obf}(s)$) from biometrics is shown in FIG. 6. The process 600 begins with the user(s) providing her/their input biometric template(s) (x) 610 (e.g., via the user computing entity 310). In various embodiments, operations are then carried out on the design itself (e.g., on the user computing entity 310). The template(s) (x) 610 are pre-processed 615 in particular embodiments into a binary string and then fed into a secure sketch generator (SSG1) 620. Here, in various embodiments, the secure sketch generator ($SSG_1$) 620 is the building block within the enrollment process 600 or framework which performs an efficient and (possibly) randomized mapping of an input data and produces the protected template(s) (PI(s)). To perform the mapping, a non-invertible cryptographic hash function (e.g., SHA256) 625 is used in particular embodiments. Ideally, the protected template(s) generated from the secure sketch generator ($SSG_1$) 620 using different biometric templates 610 for the same user should match. However, in practice, it is typically not possible due to the nature of biometric data for the same individual. To address this issue, fuzzy extractors are used in some embodiments. Specifically, a fuzzy extractor is used in some embodiments in conjunction with helper data 630 to produce the same mapped template from multiple noisy templates of the same user for noise that lies within a predefined range. The helper data 630 is generated by applying an error correction code (ECC) 635. Thus, in various embodiments, the secure sketch generator ($SSG_1$) 620 includes a hash function 625 and helper data 630 to generate the protected template in a reliable manner. The transformation parameters associated with the secure sketch generator ($SSG_1$) 620 are stored in the design as $AD_1$ 640. Accordingly, the transformation parameter ($AD_1$) 640 may generate the protected biometric template (PI) for single-user and multi-user cases in the following ways.

For a single user case, when the secure sketch generator ($SSG_1$) 620 is fed the input biometric template (x) 610, the transformation parameters ($AD_1$) 640 transforms the input biometric template (x) 610 into the corresponding hashed template(s) ($K_{hash}$) 645, which is the protected biometric template (PI). The protected biometric template (PI) generated for a multi-user case is different from that generated for a single-user case. For a multi-user case, an additional input parameter is considered in various embodiments along with the input biometric template during generation of the protected biometric template. This additional input parameter is an index associated with the user during the enrollment, which remains unchanged throughout the entire process. The index here refers to the order in which the users are enrolling their biometric templates 610. Therefore, in these embodiments, a user is required to remember her index as long as she uses the design (device). The importance of this index value is discussed further herein. To begin the PI generation process for a multi-user case, the input templates (x) 610 from multiple legitimate users are received in order. Each template (x) 610 is fed to the secure sketch generator ($SSG_1$) 620 and the transformation parameters ($AD_1$) 640 transform each template (x) 610 and generate a corresponding hashed template ($K_{hash}$) 650 as the protected biometric template (PI) for each individual user.

At this point, since all of the users are to use the design (e.g., a family laptop), a common protected biometric template (PI) or hashed template ($K_{hash}$) is needed in various embodiments so that it can be used to generate a common obfuscation key ($K_{obf}$) for enrolling all the users. Here, in particular embodiments, unlike a single-user case, the protected biometric template (PI) generation for a multi-user case takes place in the designer end (e.g., in a designer computing entity 300). Therefore, the process 600 involves sending the individual hashed templates ($K_{hash}$s) 650 for each of the multi-users to the designer end. Here, in some embodiments, the process 600 continues by using a Merkle tree 655 at the designer end to combine the hash templates ($K_{hash}$s) 650 based at least in part on a Merkle tree's 655 ability for generating secure one-time signatures from large bodies of data. Specifically, a Merkle tree 655 is a tree structure where the bottom level has some nodes with each node containing the hashed output of some input data. The goal is to move upwards to the upper level by combining the information in every two successive nodes and hashing the combined information. This continues until the root of the tree is reached, where only one node containing a string is achieved. An example of PI generation using a Merkle tree 700 conducted during the enrollment process 600 for four legitimate users 710, 715, 720, 725 is shown in FIG. 7.

For the single-user case, the enrollment process 600 continues with sending the protected biometric template (PI) as the hashed template ($K_{hash}$) 645 to the designer end (e.g., the designer computing entity 300) to complete the process 600. In some embodiments, since this may be shared through a public communication channel, the protected biometric template (PI) becomes public but the transformation parameters ($AD_1$) 640 remain private. For the multi-user case, the protected biometric template (PI) is generated in the designer end, so the protected biometric template (PI) is not shared over a communication channel.

After receiving the protected biometric template (PI) (for the single-user case) or generating the protected biometric template (PI) (for the multi-user case), the process 600 continues at the designer end with generating an obfuscation key ($K_{obf}$) 660 from the protected biometric template (PI) using a physical unclonable function (PUF). Here, in particular embodiments, the PUF serves as "an object's fingerprint." Like a biometric which expresses a human's identity, a PUF is an expression of an inherent and unclonable instance-specific feature of a physical object. A PUF can be described more formally as a mapping determined by the physical characteristics of the physical object embodying it. In this respect, for a given input (called a "challenge"), the PUF provides an output (known as "responses"). According to the number of total challenge-response pairs (CRPs) available, PUFs can be classified as strong or weak. Roughly speaking, a PUF is strong if, even after giving adversary access to a PUF instance for a prolonged period, it is still possible to come up with an unknown CRP with high probability. In various embodiments, the fingerprint of the design is determined with the help of the PUF so that the design fingerprint can be used to obfuscate the design. Therefore, upon receiving the protected biometric template (PI) from the user(s), the protected biometric template (PI) is input as a challenge to the strong PUF model 665 to output the response as the obfuscation key ($K_{obf}$) 660 for the user(s).

Ideally, if the same challenge is provided multiple times to a PUF model 665, it should output the same response each time. However, in practice, this typically does not happen due to, e.g., the environmental noise and aging in the PUF. Therefore, to deal with the noisy behavior of the PUF, helper data 670 may be employed in particular embodiments for performing error correction at the output of the PUF model 665. This can ensure that if a hashed template ($K_{hash}$) from individual(s) is applied to the PUF model 665 as the challenge at different stages, the same obfuscation key ($K_{obf}$) 660 is generated as the response. Thus, the error correction code 675, along with the helper data 670 at the PUF end, is considered as the secure sketch generator ($SSG_2$) 680 responsible for generating the obfuscation key ($K_{obf}$) 660. The transformation parameters associated with the secure sketch generator ($SSG_2$) 680 are referred to as $AD_2$ 685.

Finally, after generating the obfuscation key ($K_{obf}$) 660 from the PUF model 665, the process 600 concludes with obfuscating the design using the obfuscation key ($K_{obf}$) 660 and generating the bitstream/firmware of it. Bitstream is a term commonly used in obfuscation, which means that a reconfigurable portion of the design is represented as a sequence of bits. Usually, a common practice is to share the obfuscated designs in bitstream format. With the generation of the bitstream, the enrollment process 600 for the user(s) is complete, and the bitstream is now sent back to the user(s) (e.g., the user computing entity 310) for further use. For the multi-user case, the individual node values used for Merkle tree construction are also sent to the users in various embodiments along with the protected biometric template (PI). The reason for sending the node values is detailed further herein. Upon receipt by the users, the node values are saved locally on the design (e.g., the user computing entity 310).

Turning now to FIG. 8, another diagram showing the enrollment process, identified in the figure as the enrollment stage 815, is provided. Accordingly, the biometric template (x) 610 is received at the user end 800 (e.g., the user computing entity 310) and provided as input to the secure sketch generator ($SSG_1$) 620 to generate the hashed template(s) ($K_{hash}(s)$) 645 that represents the protected biometric template (PI) 820 and the challenge 825 for the PUF model 665. Note that for the PUF model 665, the transformation parameters ($SSG_2$) 680 are stored locally at the user end 800 and at the designer end 810 (e.g., the designer computing entity 300) in various embodiments to accommodate a single-user case and a multi-user case. Therefore, the enrollment stage 815 continues with providing the hashed template(s) $K_{hash}(s)$) 645 as the challenge 825 to the PUF model 665 to generate a response 830 as the obfuscation key ($K_{obf}$) 660. The enrollment stage 815 continues with a bitstream generator 835 using the obfuscation key ($K_{obf}$) 660 to generate a bitstream 840. Here, in FIG. 8, these particular components of the enrollment stage 815 are shown at the designer end with respect to a multi-user case. Therefore, since the obfuscation key ($K_{obf}$) 660 is generated at the designer end 810 for a multi-user case, the transformation parameters ($SSG_2$) 680 located at the designer end 810 are applied.

Note that the input biometric template (x) 610 and obfuscation key ($K_{obf}$) 660 are never stored in non-volatile (permanent) memory on the card/device (e.g., the user computing entity 310) or on a server (e.g., the designer computing entity 300) in various embodiments. However, for a multi-user case, the node values at each level of the Merkle tree 655, as well as the hashed template ($K_{hash}$) 645 of individual users, are stored on the design (device) (e.g., user computing entity 310) since they are used in various embodiments to reconstruct the Merkle tree 655 in the activation stage 845 as detailed further herein.

B. Activation

Continuing with FIG. 8, a user (legitimate or illegitimate) may attempt to activate the obfuscated design during the activation process (during the activation stage 845). Accordingly, for the single-user case, the process begins with the user providing her input biometric template (x') 850 into the design at the user end 800 (e.g., the user computing entity 310). Accordingly, in particular embodiments, the transformation parameters stored as $AD_1$ 620 use the input biometric template (x') 850 to generate the user's hashed template ($K'_{hash}$) as protected biometric template (PI') 855. The process continues with applying the protected biometric template (PI') 855 as a challenge to the PUF model 665 embedded in the design and the PUF model 665, using the transformation parameters ($AD_2$) 685 derived from secure sketch generator ($SSG_2$) 680, generates the corresponding response as the obfuscation key ($K'_{obf}$) 860 for the querying user. If the querying user is an enrolled user, then the design activates 865 since the generated obfuscation key ($K'_{obf}$) 860 is the same as the original obfuscation key ($K_{obf}$) 660 used in the enrollment stage 815 to obfuscate the design.

If multiple users are enrolled in the design, then the hashed template ($K'_{hash}$) is generated differently in various embodiments than in the single-user case. To perform the activation, an obfuscation key ($K'_{obf}$) 660 is required to be constructed from the hashed template ($K'_{hash}$). However, assuming only one user is attempting to activate the device (which is plausible since biometric access control systems typically work under such a condition), the challenge is that to construct the hashed template ($K'_{hash}$), all of the enrolled users' biometric templates are needed. Typically, all of the other enrolled users are not normally present to submit their templates to help the user who is trying to activate the design.

Therefore, in various embodiments, the activation process for a multi-user case begins by taking two inputs from the querying user attempting to activate the design: the querying user's biometric template (x') 850 and the index value that she was assigned during the enrollment process. For example, suppose that an authorized user, with the index "1" assigned to her, attempts to use the design. Along with her biometric template (x') 850, she has to input her user index as well, which is "1."

After receiving the inputs from the querying user, the activation process begins with generating a corresponding hashed template ($K'_{hash}$) from the biometric template (x') 850. However, since the other enrolled users' templates are needed to construct the final hashed templates ($K'_{hash}$), as a hashed version of the biometric template 610 for each of the enrolled users is stored in particular embodiments on the design so that the Merkle tree 655 can be constructed to generate the protected biometric template (PI') 855, or the hashed template ($K'_{hash}$), when needed without requiring the other enrolled users to be present. It is worth noting that by solely saving the hashed version of a user's template in these particular embodiments, if a proper hash function is used, no exploitable vulnerability is likely to be found by an adversary.

Upon receiving the user's index, various embodiments involve initially determining the specific nodes of the Merkle tree 655, which are required to generate the root of the tree 655 that is the desired hashed template ($K'_{hash}$). An advantage of the Merkle tree 655 is that, in order to determine the root, not all the node values are needed to be known in all levels. Instead, only a few node values are needed to reach the root. Turning briefly to FIG. 9, where the user "1" is trying to activate the device, values from only three nodes 900, 910, 915 are needed to determine the hashed template ($K'_{hash}$=PI') 920. Now that these nodes 900, 910, 915 are known, the values corresponding to these nodes 900, 910, 915 are collected from memory. Utilizing these node values along with the generated hashed template ($K'_{hash}$) value for the user, finally the hashed template ($K'_{hash}$=PI') 920 is generated. Returning to FIG. 8, after determining protected biometric template (PI') 855 (e.g., the hashed template 920 from the Merkle tree 655), the activation process continues with sending the protected biometric template (PI') 855 as an input to the PUF model 665 implemented on the design, and the obfuscation key ($K'_{obf}$) 860 is generated. Only if the query is made by one of the enrolled users, the protected biometric template (PI') 855 as well as obfuscation key ($K'_{obf}$) 860 generated by the querying user are the same as the original protected biometric template (PI) 820 and original obfuscation key ($K_{obf}$) 660 generated at the designer end 810 in the enrollment stage 815, thus the design is activated 865.

In addition, in some embodiments, supplementary data (z) 870, such as, for example, a non-biometric secret key or password, can be considered as an optional input given by the user at the enrollment stage 815. Such does not only act as an additional layer for secured activation, but can also offer revocability in allowing a user to re-issue a new template. Nonetheless, incorporating this supplementary data 870 may be optional in particular embodiments and can depend on the user's decision to employ.

Accordingly, various embodiments can provide strong template protection since these embodiments do not save the raw version of the biometric templates 610, and more importantly, do not make the transformation parameters ($AD_1$, $AD_2$) 640, 685 publicly accessible. This advantage can be further enhanced in some embodiments by applying collision-free hash functions in both of the secure sketch generators ($SSG_1$, $SSG_2$) 620, 680 and Merkle tree 655. For such hash functions, it is computationally difficult/to near impossible for an attacker to successfully retrieve the pre-image (i.e., original biometric template 610) from the hash output (i.e., protected template 820). Thus, various embodiments can ensure irreversibility of biometric templates 610. In addition, various embodiments can ensure unlinkability using the same mechanism and by not making the transformation parameters ($AD_1$, $AD_2$) 640, 685 public. In order to examine whether multiple templates from the same user are linked or not, the attacker would first have to retrieve the original biometric templates from their protected versions. Typically, hashed templates of a user cannot be identical due to the (even slight) differences between the original templates caused by their noisy nature. Therefore, an adversary would have to compare the original templates to find out whether they are linked or not. Thus, since the transformation parameters ($AD_1$, $AD_2$) 640, 685 are not made public in various embodiments, the attacker is unable to utilize the parameters ($AD_1$, $AD_2$) 640, 685 to extract the original templates 610 from the protected templates 820. Even if an attacker were somehow able to access the transformation parameters ($AD_1$, $AD_2$) 640, 685, the attacker would still not likely be able to perform the extraction because of the one-way functionality of the cryptographic hash function 625. Thus, various embodiments can ensure unlinkability in that an attacker is unable to derive a user's original templates 610 from the protected versions of the templates 820 and search for links among them.

IV. Exemplary Security Measures Provided by Various Embodiments

Accordingly, a discussion is now provided on security measures offered by various embodiments of the framework in each stage of operation.

A. Attacks Prevented by Various Embodiments

Unlike many conventional biometric systems, various embodiments avoid having to store raw biometric templates 610, helping to eliminate the threat of attacks targeting stored templates. In addition, various embodiments are implemented without the use of a matcher and/or decision module, essentially eliminating the threat of attacks on such modules. Instead, various embodiments involve the use of an obfuscation key ($K_{obf}$) 660 in resolving a device-unique obfuscation, removing the threat of semi-invasive nor non-invasive attacks.

Further, in particular embodiments, the bitstream of the application design is locked instead of any software-level authentication, essentially eliminating the threat of software-based attacks, such as Trojans, malware, and buffer overflow. As for attacks on module interfaces, such attacks are prohibited in particular embodiments due to the absence of a matcher module. That is to say, no attacks can be launched at the specific point in a system where the output of the matcher module exists since no matcher module exists in these embodiments.

In some instances, an attacker may attempt to apply a hill-climbing attack by injecting a synthesized feature vector. This attack improves the key in a bit-wise manner by observing the behavior of the system in which all the key bits are typically examined before the termination of the attack. However, the bitstream obfuscation used in various embodiments thwarts this attack by magnifying any single-bit error. For instance, a single-bit difference in a field-programmable gate array (FPGA) hardware lookup table (LUT) may alternate a NAND gate to an XOR gate. This alteration may randomly change the system behavior and prevent the attacker in obtaining the correct key. Similarly, these attacks can be prevented in embodiments of the framework involving a multi-user case.

Finally, an attacker may launch a chosen-plaintext attack against embodiments of the framework in the hope that more information about, e.g., firmware customization and the structure of the bitstream, can be achieved. In this regard, the attacker would have to enroll repeatedly. However, such enrollment is not allowed in various embodiments.

B. Attacks Against Various Embodiments and Corresponding Countermeasures

Some attacks may be attempted at the sensor level of various embodiments of the framework such as, for example, applying fake biometric or replaying old data. Since various embodiments involve acquiring the raw biometric trait directly from the sensor, an attacker could inject fake biometric or replay old traits in an attempt to gain unauthorized access. For overriding the feature extractor, an attacker could force the feature extractor to produce the wrong feature set that can induce DoS issues. Accordingly, a discussion is now provided with respect to different attacks that could be launched against various embodiments of the framework. Of the various scenarios discussed, the construction of the PUF model 665, helper data 630, 670, and the ECC 635, 675 are known publicly.

i. Attacks Against Merkle Tree

In particular embodiments, a Merkle tree 655 is implied with an associated hash function 625 that may lead to attacks that involve attempting to recover the template nodes at the Merkle tree 655 and injecting fake templates. Here, an attacker may mount a template recovery attack by attempting to recover the biometric template for the hashed template. In addition, the attacker may mount a fake template attack by injecting noisy/spoofed biometric traits to attempt to access the design. However, such attacks may be handled in various embodiments by choosing a strong hash function 625, appropriate parameters for the Merkle tree 655, and/or adopting an overall robust structure.

ii. Non-Invasive Obfuscation Key Piracy

In this attack scenario, an adversary, who is a legitimate owner of a design (device), attempts to generate obfuscation keys ($K_{obf}$s) 660 associated with other devices. Such an attack may not necessarily be launched against a specific device using an embodiment of the framework, but against manufacturers of such devices. Thus, design manufacturers may face risk of exposing confidential information, e.g., intellectual property (IP), due to this type of attack. A prime example of this class of adversarial activities includes attacks against companies producing pay-TV smart cards. Here, the goal of the attacker may be, for example, endangering the brand image of the device manufacturer that results in sales losses, allowing access to devices to non-legitimate users, etc. Therefore, no specific owner of a device may be targeted, but instead, the attacker may be interested in revealing as many obfuscation keys ($K_{obf}$s) 660 as possible to be potentially shared with non-legitimate users. These users may further employ the keys 660 crafted by the attacker to access the devices without enrollment, for instance, by launching an invasive attack.

To generate the specially crafted keys 660, the attacker may observe her own obfuscations key ($K_{obf}$) 660, and based on that, generate some similar keys 660 that can be associated with other devices equipped with an embodiment of the framework. Here, it may be possible to guess other valid responses of a strong PUF employed in various embodiments implemented on other devices by observing a set of the responses of the corresponding PUF. For instance, consider the set of PUF responses $Y \in \{0, 1\}^n$. For an ideal PUF, where all bits of an n-bit PUF response are independent, the probability of guessing an unseen, valid response y' is $2^{-n}$. However, typically, there are correlations between the bits of the responses of PUFs implemented on different chips. Thus, the probability of response collision among m chips with embedded (unbiased) PUFs that generate n-bit responses is:

$$\Pr_{collision} = 1 - \prod_{i=1}^{m}(1 - (i-1)/2^n)$$

Here, although the collision probability depends on the value of m and n, for the practical values of these parameters (e.g., n=64) the probability of finding a collision is often negligible. Therefore, using appropriate PUFs with desired, well-chosen parameters in particular embodiments helps to prevent this type of attack.

iii. Injection of Fake (Noisy) Biometric Traits

This type of attack can be categorized as invasive. Here an attacker, who is not a legitimate owner of a design (device), has physical access to the device. In this attack scenario, the attacker may steal the biometric trait of the owner of the device as well, i.e., spoofing attack. While in some instances, the attacker may mount the attack by injecting noisy (fake) biometric traits. Although what can be observed by the attacker seldom changes, i.e., the device not working, even this can be helpful to the attacker. This class of attacks may be referred to as helper data manipulation, since the attacker aims at obtaining the valid obfuscation key ($K_{obf}$) 660 by testing noisy input that can be corrected by using the helper data 630. This may assume that the helper data 630 is public. Accordingly, various embodiments of the framework prevent this type of attack by hashing the helper data 630 together with the hashed version of the protected template PI (=$K_{hash}$) 645.

V. Exemplary Implementations of Various Embodiments

Now discussed are the configurations of some of the modules included in various embodiments, namely hardware obfuscation, secure sketch generators, fuzzy extractors, and Merkle trees. Accordingly, in particular embodiments, these configurations may be implemented to ensure the security of the framework.

A. Hardware Obfuscation

Hardware obfuscation encapsulates a series of techniques, which lock a design (e.g., implemented as a chip, device, system, and/or the like) by blocking its normal function at the hardware level until a correct "key" is applied. Accordingly, a "bitstream" obfuscation scheme may be used in various embodiments for strengthening security during obfuscation. In this respect, a bitstream (sequence of bits) describes the configuration of a design executed in field-programmable gate arrays (FPGAs). These platforms offer a great deal of design flexibility due to their re-configurability feature: the ability to customize the Boolean function (e.g., 4-input AND function) of an integrated circuit (IC) and their connections.

Bitstream obfuscation techniques leverage this property of FPGAs by, for example, employing unused FPGA resources within an existing design, thereby incurring very little overhead. For instance, the original design may leave part of the FPGA lookup table (LUT) configuration bits unoccupied. After obfuscation, these unused bits can be filled with other functions. The correct response depends on the key input position and value. Bitstream obfuscation allows the key to change for every chip/user due to the configurable hardware. This feature can be beneficial since a biometric-derived key can be different from user to user. Other obfuscation approaches are fixed by a master key and cannot be adapted in this manner. Thus, various embodiments of the framework can offer security while performing hardware obfuscation by making a design key-dependent that can only be used in a meaningful manner by authorized parties with access to the key. In addition, the key in various embodiments is a function of biometric inputs from one or more users as well as the hardware device.

While an FPGA can be configured multiple times, in scenarios where embodiments are implemented on such a platform, for each chip/user pair, the configuration may only happen once. Such is a proper approach commonly practiced for many commercial products.

To this end, as an example, a Flash-based or an embedded FPGA (i.e., so-called eFPGA) can be used in particular embodiments, where after loading the bitstream, it is not possible to be overwritten. For a Flash-based FPGA, this can be done by deactivating the re-programming, in particular, by setting a flag. As for eFPGAs, since they are SRAM-based, if the bitstream is stored in an internal non-volatile memory in the same package, the re-programming option can be deactivated by setting a flag in some eFuses/Flash memories.

B. Secure Sketch Generators (SSGs) and Fuzzy Extractors

Secure sketch generators (SSGs) 620, 680 are shown to be helpful in producing public information corresponding to their biometric input (x) 610 while disclosing as little information as possible about the input (x) 610. To ensure the security of the secure sketch, the following analysis can be performed. Let x 610 denote the random variable corresponding to the input vectors. Similarly, the transformation parameters (AD) 640, 685 are the vectors of the helper data 630, 670. Now let $H_\infty(x)$ be the ingoing min-entropy of x 610, and $H_\infty(x|AD)$ show the conditional min-entropy of x 610 given AD 640, 685. If Equation 1 on the min-entropy loss $\Delta H_\infty$ holds, the security of the sketch is guaranteed.

$$\Delta \tilde{H}_\infty = \tilde{H}_\infty(x) - \tilde{H}_\infty(x|AD) \le h \qquad \text{Equation 1}$$

In Equation 1, h represents a certain upper bound on the min-entropy loss. Those of ordinary skill in the field may note that $\Delta H_\infty$ is a widely accepted and well-known measure of the security and privacy performance.

The secure sketch discussed above cannot cope with the problem of nonuniformity of the inputs given to it. In this respect, a randomness extractor can be employed in various embodiments to derive a uniform string from the secure sketch output. In addition, pairwise-independent hash functions, as an example of strong randomness extractors, can be used in embodiments for constructing fuzzy extractors from secure sketches.

A natural question to ask is how and to what extent a biometric template 610 can be extracted and retrieved, given access to the helper data 630, 670 stored in a database and/or on a device/card. The primary purpose of extracting helper data 630, 670 in various embodiments is to guarantee that a certain, unique string can be derived from the biometrics of a device owner during both the authentication and the enrollment phases. Accordingly, in some embodiments, this data 630, 670 may be stored in a database and considered public. However, an impersonation attack can be prevented in these embodiments by defining a "reference data" that is statistically independent of the helper data 630, 670 by applying, for example, hash functions 625. By doing this, the impersonation can become computationally infeasible. In addition, the least amount of information (e.g., no sensitive information) about the original biometrics is publicly disclosed in some embodiments.

When the requirements mentioned above are fulfilled, the biometric template 610 cannot likely be compromised. To this end, various embodiments of the framework involve setting the mutual information between the helper data 630, 670 and the secrets sufficiently small, and the secrets extracted from the biometric template 610 are uniformly distributed. More formally, $\Delta H_\infty = H_\infty(x) - H_\infty(x|AD) \le h$. This mutual information can be kept small so that it is impossible to derive a good (in the least squared sense) estimate of the biometric template x 610 given the helper data AD. Furthermore, the interesting problem of maximizing $H_{inf}(x|AD)$ along with minimizing the false reject rate (FRR) can be formalized using the mutual information $\Delta H_\infty$ properly.

Note that the construction of secure sketches and fuzzy extractors discussed above holds in general, that is, in both of the biometrics- and PUF-related scenarios. In other words, the schemes discussed here can be applied not only to extract nearly uniform randomness from a biometric input, but also, they are applicable in PUF-based schemes.

In the context of PUFs, fuzzy extractors attempt to address the issue with reproducibility. The problem originates in the noisy nature of PUFs (e.g., voltage supply noise, temperature variations, aging, etc.) and can be resolved by implementing additional post-processing logic to generate reproducible and (nearly) uniformly distributed keys. Hence, in embodiments of the framework, a strong PUF is not taken into account as a standalone primitive, but as a combination of all required processing add-ons, e.g., fuzzy extractors.

C. Merkle Trees

As previously discussed, a Merkle tree construction is used in various embodiments of the framework for generating a common hashed version of a protected template ($K_{hash}$) shared by all legitimate users in the multi-user case. In these embodiments, the tree 655 may be first constructed at the designer end 810 during the enrollment stage 815 to generate the common hashed template ($K_{hash}$) or protected template (PI). Then the individual node values (in a hashed format) are shared with the users so that they can store them in the device and use them for constructing the same Merkle tree 655 for getting the same hashed template ($K'_{hash}$) or protected template (PI') 855 when any of them attempt to activate the device.

Therefore, in particular embodiments, the security of the Merkle tree 655 is important because the node values are public since they are shared via a communication channel and stored in the device. With that said, using hash functions involved in the Merkle tree 655 that are collision-free can make it difficult for an attacker to extract the preimage/input from the hash outputs at each node, resulting in the hash functions, and consequently, the Merkle tree 655 is considered secure. Therefore, various embodiments of the framework make use of cryptographic hash functions (e.g., SHA256) in the Merkle tree 655 to provide security to the nodes.

VI. Exemplary Studies

A discussion is now provided with respect to performance of various embodiments described herein. In doing so, a suitable performance metric is further introduced as follows. As discussed earlier, in the enrollment stage 815 of various embodiments, the hardware obfuscation takes place, which relies on the obfuscation key ($K_{obf}$) 660 (a function of biometric template 610 of enrolled user(s) and the design itself). Accordingly, in particular embodiments, the obfuscation key ($K_{obf}$) 660 is not made public, and therefore, unknown to an attacker. While in the activation stage 845, the biometric template 850 of a querying person is received, and the corresponding obfuscation key ($K'_{obf}$) 860 for unlocking the design is generated. Therefore, it is important to understand whether the obfuscation key ($K'_{obf}$) 860 has been unsuccessful in activating the design in evaluating the performance of various embodiments in that if activation is supposed to fail, this kind of querying person is considered an "attacker" or "imposter." Since the obfuscation key ($K_{obf}$) 660 may not be normally stored, a comparison between the original obfuscation key ($K_{obf}$) 660 and the obfuscation key ($K'_{obf}$) 860 generated for a querying person cannot be performed to show whether the design is activated or not. Therefore, the output corruption of the design for different obfuscation keys ($K'_{obf}$s) 860 generated from biometric templates 850 of both enrolled users and attackers is observed and used as a performance metric. If the querying person is an imposter, the output patterns of the design should be corrupted (e.g., significantly), and the design remains unusable. If the querying person is an enrolled user, the output patterns of the design should not be corrupted.

To observe the performance of various embodiments in different conditions, twelve experiments were conducted in two different categories (single-user and multi-user case) and the output corruption of the design was observed for querying users, being enrolled or attacker. To generate the output patterns, the hardware design simulator Xilinx Vivado was used, and specifically the s9234 hardware design from the ISCAS89 benchmark suite as the design under test. Note that various embodiments are compatible with a majority of biometric modality since such embodiments involve necessary error corrections and hash applications on all the templates irrespective of the modality type. For all the experiments, the publicly available face dataset "Faces94" was considered, which has one hundred and fifty-two individuals with twenty samples per class.

To begin, the obfuscated version of the design is generated using the obfuscation key ($K_{obf}$) 660 obtained from the biometric templates 610 of enrolled user(s). Next, the hardware design is augmented with a new set of input ports (in addition to existing input ports) through which the obfuscation key ($K_{obf}$) 660 can be applied. To observe the output corruption of an obfuscated design for a specific user, the corresponding ($K'_{obf}$) 860 from the querying user is applied to the hardware design throughout the simulation of 10,000 clock cycles. The other input ports of the design are applied with different random input vectors at each clock cycle. The corresponding output pattern is stored in a file for further analysis. Since the hardware design has thirty-nine output pins, for each cycle, an output pattern of thirty-nine bits is captured. Each of these patterns is compared with the correct output pattern obtained from the unlocked version of the design and obtain the Hamming distance (HD). A zero HD indicates that the output of the design generated from the user exactly matches the output of the original (unobfuscated) design. A high HD indicates that the output is highly corrupted due to the application of a wrong obfuscation key ($K'_{obf}$) 860.

The results from each experiment with a boxplot containing the mean, maximum, and minimum HD for each case is shown in the table 1000 found in FIG. 10. Accordingly, a summary of those experiments is described below, and the results (mean, minimum, maximum, median and mode HD values) are enlisted in the table 1000. To demonstrate the performance of various embodiments, the minimum HD is emphasized since it portrays the worst-case scenario; that is, if there is a minimum of difference present in the output pattern when the querying person is an attacker, the design will not be activated even though its corruption is least.

A. Single-User Case

In this experiment, the design is obfuscated for only a single user. The remaining one hundred and fifty-one people are considered as attackers who attempt to activate the design with their corresponding obfuscation key ($K'_{obf}$) 860. According to the table 1000 shown in FIG. 10, a minimum of 13% output corruption 1010 is shown when the attackers try to activate the design. Even if wolves (e.g., imposters who can legitimately impersonate the enrolled users because of their high similarity with them) are selected as attackers, at least 13% output corruption 1015 is observed. Another experiment was also conducted where the enrolled user for one design attempts to activate one hundred different obfuscated designs in which she was not enrolled. After comparing the output patterns for the design in which she was enrolled and the one hundred designs in which she was not, a minimum of 12% output corruption 1020 and an average of 22% output corruption 1025 were observed.

B. Multi-User Case

For this experiment, the design is obfuscated to be used by multiple enrolled users. Accordingly, performance of various embodiments should not be affected if the number of enrolled users varies. To verify this, three different experiments were conducted where the design is obfuscated by enrolling eight, sixteen, and thirty-two users. Among the rest of the users, one hundred individuals were chosen as attackers who attempt to activate the design, and at least 11% (at 1030), 12% (at 1035), and 10% (at 1040) of output corruption were observed to always be present, respectively.

Whether the same happens if the attackers are the wolves was also verified. Accordingly, an additional experiment was conducted for verifying this. The design was obfuscated for eight users, and the attackers were wolves for three individual enrolled users. These three enrolled users are randomly chosen (e.g., user ids #1, 4, and 7) with twenty-eight, fourteen, and twenty-five wolves, respectively. When the wolves attempted to activate the device, a minimum 18% (at 1045), 13% (at 1050), and 13% (at 1055) of output corruption were noticed, respectively.

Moreover, whether choice of the hash function in the Merkle tree 655 affects the performance of various embodiments of the framework was validated. Here, three different hash functions were considered: sha2-256; sha2-512; and sha3-256, since NIST recommends these cryptographic hash functions for the Merkle tree 655. The results in table 1000 imply that embodiments of the framework are able to obtain a minimum 9% (at 1060), 14% (at 1065), and 12% (at 1070) of output corruption with the three mentioned hash functions, respectively. Accordingly, the above results demonstrate that various embodiments of the framework have the potential of limiting attackers from activating a design irrespective of whether the design is for single-user or multi-user, attackers have high similarity with the enrolled user(s), and/or whatever hash function is used.

To demonstrate the effect of a wrong key in activation/output of an obfuscated design, another separate experiment was conducted. An RGB image to grayscale image converting function has been considered as a design, which has been obfuscated with a genuine user's biometric key. The results are portrayed in FIG. 11. Here during de-obfuscation of the input image 1100, if the correct key is provided, the function will be successfully activated and the corresponding output image 1110 is provided. Now, if any attacker attempts to activate the same obfuscated design (the RBG-to-grayscale converting function), the key generated from the attacker's template will be different from the original user's template derived obfuscation; hence the attacker will never achieve the exact same output image 1110. For the Faces94 dataset, 46% HD exists on average between a user and an attacker's biometric template, as well as a template derived from an obfuscation key. Therefore, de-obfuscation of the obfuscated design was performed with 10%, 30%, and 50% altered key from the genuine obfuscation key and achieved noisy output image 1115, image 1120, and image 1125, respectively, as shown in FIG. 11. However, with a key more than 30% alteration, the obfuscated design was not activated at all, and hence no output could be obtained. In fact, the correlation coefficient among the images 1100, 1110, 1115, 1120, 1125 are very poor (0.0034, 0.0053, and 0.0015, respectively).

VII. Exemplary Applications for Various Embodiments

Two applications in which various embodiments of the framework for the single-user case can be used include a commercial application, such as a smartphone, and a military application, such as a drone. The use of various embodiments described herein for these applications is now demonstrated in which the user may be considered the individual who operates the design (e.g., a device embodied by user computing entity 310) and the manufacturer is the party who produces the device, and is assumed to be trusted. Finally, the distributor is the party who sells the device to the user.

For smartphone activation, the user may be a consumer and the manufacturer may be the smartphone maker, such as Apple, Samsung, etc. The distributor may be the telecommunication company used for providing service for the smartphone, such as Verizon, AT&T, etc. The distributor purchases the smartphone from the smartphone maker, which cannot be used before activation. The consumer shops at the distributor and decides to purchase the smartphone. During enrollment, the consumer inputs her biometric template (x) 610 to the smartphone and obtains the hashed version of the protected template ($K_{hash}$) 645. This key value is transmitted to smartphone maker by the distributor. Accordingly, the smartphone maker updates the carrier firmware with the received key value and sends the updated carrier firmware to the distributor for activating the smartphone. Afterward, the user can apply her biometric template (x') 850 to unlock/activate the smartphone. A similar enrollment, as well as activation procedure, can be followed for a military application. For example, for the military drone, the user can be the soldier who operates the drone, the manufacturer can be a government lab or a defense contractor, and the distributor can be a research lab or another trusted party who enrolls the solider and activates the drone.

Note that during the enrollment and activation processes, the user never shares her biometric template 610 with the distributor or manufacturer. Accordingly, various embodiments enable the parties to preserve their confidential information throughout the entire enrollment and activation processes. In addition, various embodiments bind the biometric template 610 of a device owner to the physical characteristics of the device used by her or him in such a way to make retrieval of the original biometric template 610 of the user or characteristics of the device (ex. PUF model) practically impossible.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for configuring biometric access for a plurality of legitimate users to a design, the method comprising:
   receiving a plurality of biometric templates, wherein each biometric template has originated from one of the plurality of legitimate users;
   obtaining a protected biometric template for each of the plurality of biometric templates using a first secure sketch generator (SSG) and first transformation parameters;
   determining a common protected biometric template for the plurality of legitimate users based at least in part on combining a plurality of protected biometric templates using a Merkle tree and a corresponding index value for each of the plurality of legitimate users;
   causing the design to be obfuscated based at least in part on a common obfuscation key generated from the common protected biometric template using a second SSG and second transformation parameters, wherein the design is configured to be de-obfuscated for a given legitimate user responsive to biometric input from the given legitimate user.

2. The method of claim 1, wherein the first transformation parameters comprise a hash function configured to be used to hash a biometric template for a legitimate user to generate a corresponding protected biometric template.

3. The method of claim 1, wherein the second SSG is configured to use second transformation parameters comprising a fingerprint associated with the design, the fingerprint being a physical unclonable function, to generate the common obfuscation key.

4. The method of claim 1, wherein causing the design to be obfuscated comprises receiving a bitstream representing obfuscated portions of the design, the bitstream generated from the common obfuscation key.

5. The method of claim 1, further comprising:
   receiving a querying biometric template and a querying index value originating from a querying user;
   generating a querying protected biometric template from the querying biometric template using the first transformation parameters;
   identifying a querying common protected biometric template using the Merkle tree, the querying protected biometric template, and the querying index value;
   generating a querying common obfuscation key based at least in part on applying the querying common protected biometric template to the second transformation parameters stored on the design; and
   causing the design to be de-obfuscated using a querying common bitstream generated from the querying common obfuscation key.

6. The method of claim 5, wherein the de-obfuscation of the design is caused based at least in part on comparing the querying common bitstream with a received bitstream representing obfuscated portions of the design and determining that the querying common bitstream and the received bitstream are at least approximately similar.

7. The method of claim 5, wherein the first transformation parameters, the second transformation parameters, and the plurality of protected biometric templates are stored on the design.

8. An apparatus for configuring biometric access for a plurality of legitimate users to a design, wherein the apparatus comprises at least one processor and a memory comprising computer executable instructions, the memory and the computer executable instructions configured to, with the at least one processor, cause the apparatus to:
- receive a plurality of biometric templates, wherein each biometric template has originated from one of the plurality of legitimate users;
- obtain a protected biometric template for each of the plurality of biometric templates using a first secure sketch generator (SSG) and first transformation parameters;
- determine a common protected biometric template for the plurality of legitimate users based at least in part on combining a plurality of protected biometric templates using a Merkle tree and a corresponding index value for each of the plurality of legitimate users;
- cause the design to be obfuscated based at least in part on a common obfuscation key generated from the common protected biometric template using a second SSG and second transformation parameters, wherein the design is configured to be de-obfuscated for a given legitimate user responsive to biometric input from the given legitimate user.

9. The apparatus of claim 8, wherein the first transformation parameters comprise a hash function configured to be used to hash a biometric template for a legitimate user to generate a corresponding protected biometric template.

10. The apparatus of claim 8, wherein the second SSG is configured to use second transformation parameters comprising a fingerprint associated with the design, the fingerprint being a physical unclonable function, to generate the common obfuscation key.

11. The apparatus of claim 8, wherein causing the design to be obfuscated comprises receiving a bitstream representing obfuscated portions of the design, the bitstream generated from the common obfuscation key.

12. The apparatus of claim 8, wherein the memory and the computer executable instructions are further configured to, with the at least one processor, cause the apparatus to:
- receive a querying biometric template and a querying index value originating from a querying user;
- generate a querying protected biometric template from the querying biometric template using the first transformation parameters;
- identify a querying common protected biometric template using the Merkle tree, the querying protected biometric template, and the querying index value;
- generate a querying common obfuscation key based at least in part on applying the querying common protected biometric template to the second transformation parameters stored on the design; and
- cause the design to be de-obfuscated using a querying common bitstream generated from the querying common obfuscation key.

13. The apparatus of claim 12, wherein the de-obfuscation of the design is caused based at least in part on comparing the querying common bitstream with a received bitstream representing obfuscated portions of the design and determining that the querying common bitstream and the received bitstream are at least approximately similar.

14. The apparatus of claim 12, wherein the first transformation parameters, the second transformation parameters, and the plurality of protected biometric templates are stored on the design.

15. A non-transitory computer program product for configuring biometric access for a plurality of legitimate users to a design, the computer program product comprising at least one computer-readable storage medium having computer-readable program code portions stored therein, the computer-readable program code portions comprising executable portions configured to cause at least one processor to:
- receive a plurality of biometric templates, wherein each biometric template has originated from one of the plurality of legitimate users;
- obtain a protected biometric template for each of the plurality of biometric templates using a first secure sketch generator (SSG) and first transformation parameters;
- determine a common protected biometric template for the plurality of legitimate users based at least in part on combining a plurality of protected biometric templates using a Merkle tree and a corresponding index value for each of the plurality of legitimate users;
- cause the design to be obfuscated based at least in part on a common obfuscation key generated from the common protected biometric template using a second SSG and second transformation parameters, wherein the design is configured to be de-obfuscated for a given legitimate user responsive to biometric input from the given legitimate user.

16. The non-transitory computer program product of claim 15, wherein causing the design to be obfuscated comprises receiving a bitstream representing obfuscated portions of the design, the bitstream generated from the common obfuscation key.

17. The non-transitory computer program product of claim 15, wherein the memory and the computer executable instructions are further configured to cause the at least one processor to, with the at least one processor, cause the apparatus to:
- receive a querying biometric template and a querying index value originating from a querying user;
- generate a querying protected biometric template from the querying biometric template using the first transformation parameters;
- identify a querying common protected biometric template using the Merkle tree, the querying protected biometric template, and the querying index value;
- generate a querying common obfuscation key based at least in part on applying the querying common protected biometric template to the second transformation parameters stored on the design; and
- cause the design to be de-obfuscated using a querying common bitstream generated from the querying common obfuscation key.

18. The non-transitory computer program product of claim 17, wherein the de-obfuscation of the design is caused based at least in part on comparing the querying common bitstream with a received bitstream representing obfuscated portions of the design and determining that the querying common bitstream and the received bitstream are at least approximately similar.

* * * * *

UNITED STATES PATENT AND TRADEMARK OFFICE
CERTIFICATE OF CORRECTION

PATENT NO. : 11,989,273 B2
APPLICATION NO. : 17/544453
DATED : May 21, 2024
INVENTOR(S) : Forte et al.

It is certified that error appears in the above-identified patent and that said Letters Patent is hereby corrected as shown below:

In the Claims

Column 36,
Lines 39 and 40, in Claim 17, "processor to, with the at least one processor, cause the apparatus to:" should read --processor to:--.

Signed and Sealed this
Twentieth Day of August, 2024

Katherine Kelly Vidal
Director of the United States Patent and Trademark Office